United States Patent
Shih

(10) Patent No.: US 7,961,980 B2
(45) Date of Patent: Jun. 14, 2011

(54) METHOD FOR PROVIDING OUTPUT IMAGE IN EITHER CYLINDRICAL MODE OR PERSPECTIVE MODE

(75) Inventor: Kuang-Yen Shih, Taipei (TW)

(73) Assignee: Imay Software Co., Ltd., Taipei (TW)

(*) Notice: Subject to any disclaimer, the term of this patent is extended or adjusted under 35 U.S.C. 154(b) by 957 days.

(21) Appl. No.: 11/834,252

(22) Filed: Aug. 6, 2007

(65) Prior Publication Data

US 2009/0041379 A1    Feb. 12, 2009

(51) Int. Cl.
*G06K 9/36* (2006.01)
(52) U.S. Cl. .................... 382/285; 382/276; 382/100
(58) Field of Classification Search .............. 382/100, 382/276

See application file for complete search history.

(56) References Cited

U.S. PATENT DOCUMENTS

| | | | |
|---|---|---|---|
| 5,990,941 A * | 11/1999 | Jackson et al. | 348/207.99 |
| 7,317,473 B2 * | 1/2008 | Chen et al. | 348/39 |
| 2002/0118890 A1 * | 8/2002 | Rondinelli | 382/276 |
| 2005/0030643 A1 * | 2/2005 | Gal et al. | 359/725 |
| 2008/0074500 A1 * | 3/2008 | Chen et al. | 348/207.1 |

* cited by examiner

*Primary Examiner* — Bhavesh M Mehta
*Assistant Examiner* — Stephen R Koziol
(74) *Attorney, Agent, or Firm* — Ming Chow; Sinorica, LLC

(57) ABSTRACT

A method is disclosed for transforming a wide-angle video image in to a Perspective view or a Cylindrical video image with reduced distortion. The method for providing an output image in either a Cylindrical mode or a Perspective mode, and comprising steps of: (1) acquiring a wide-angle image, which is a circular projection image, which format selected from the group of full circle, rounded rectangle, and full projection; (2) using a degree of view (DOV) and a radius of a projected circular region of the wide-angle image to select an image in one of Azimuthal modes; (3) specifying a horizontal field of view range (HFOVR) and a vertical field of view range (VFOVR) as a source projection image region, which is in Azimuthal mode; (4) converting the source projection image region in Azimuthal mode into a new source projection image region in Cylindrical mode; (5) converting the new source projection image in Cylindrical mode into another source projection image in Perspective mode; and (6) generating the output image.

20 Claims, 26 Drawing Sheets

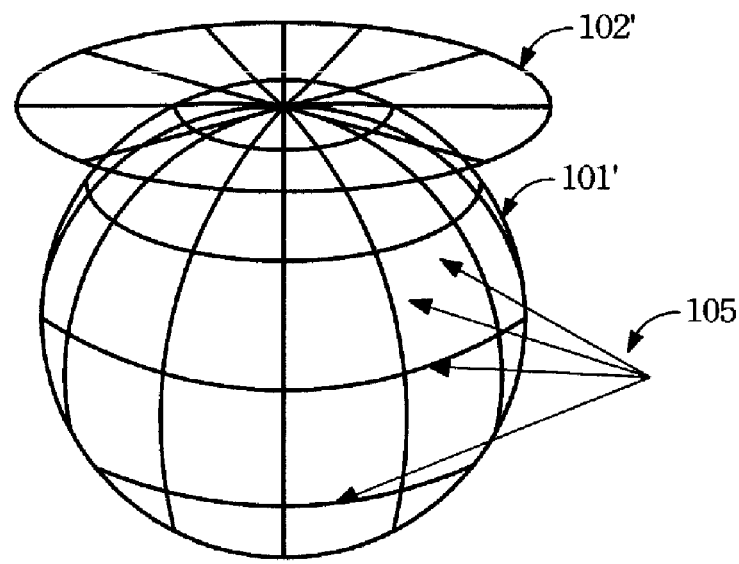
F I G . 1 A - 1
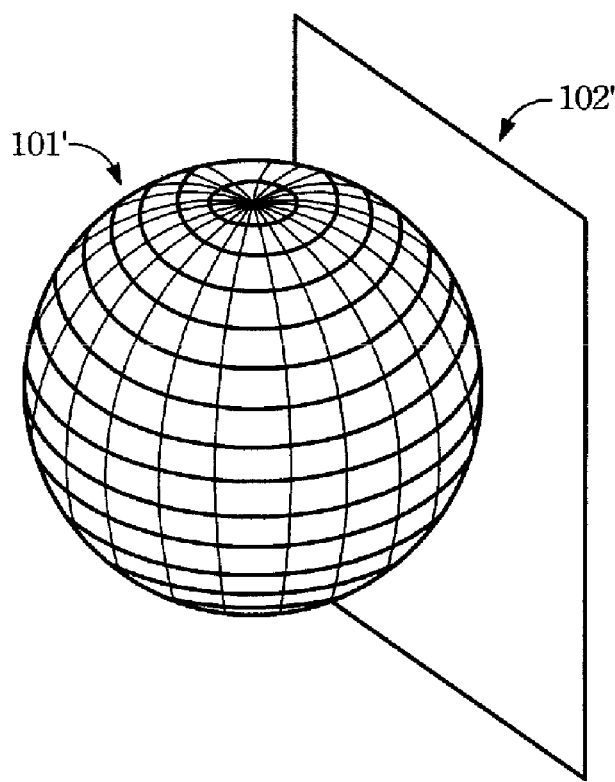
F I G . 1 A - 1'

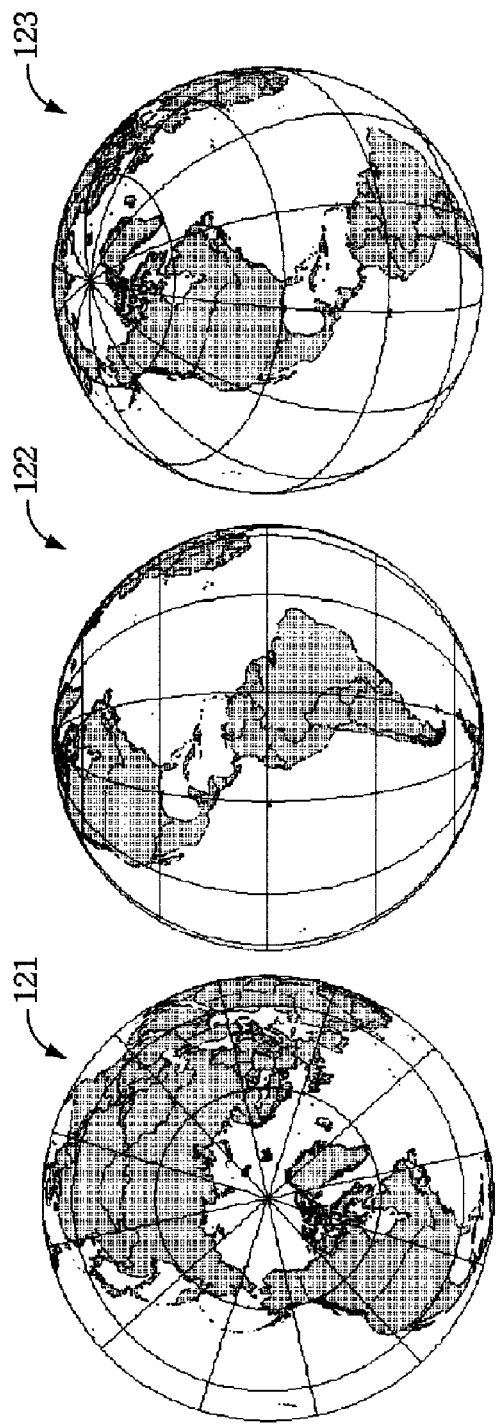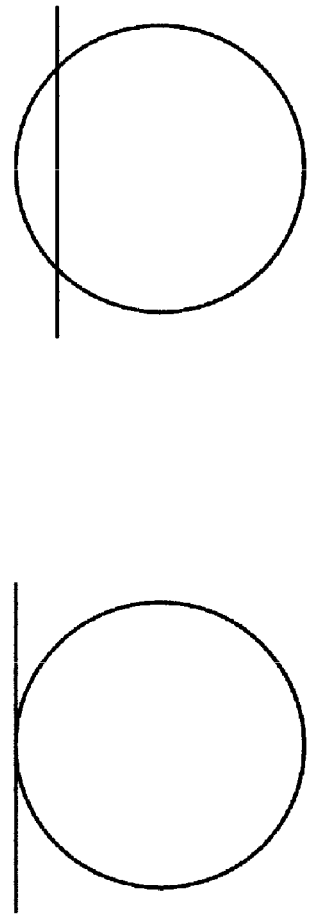
FIG.1B-1  FIG.1B-2  FIG.1B-3  FIG.1B-4  FIG.1B-5

| Azimuthal Modes | DOV<150 Degree | DOV:150~180 Degree | DOV>180 Degree |
|---|---|---|---|
| Orthographic | GOOD | Ordinary, distortion increase when DOV approach to 180 degree | Not Available |
| Stereographic | GOOD | Excellent | Excellent, But Worse when DOV Approach to 360 degree |
| Gnomonic | Excellent | Worse, when DOV Approach to 180 degree | Not Available |
| Equal-Area | GOOD | Ordinary | Ordinary |
| Equal-Distance | GOOD | Ordinary | Ordinary |
| Vertical Perspective | Excellent | Excellent | Not Available |

Wide-Angle Image Compare Different Azimuthal Coordinate in Different DOV (Degree Of View) Range.

FIG. 2

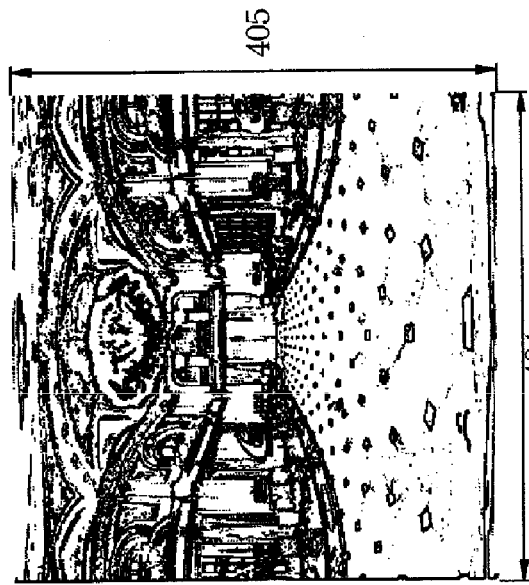
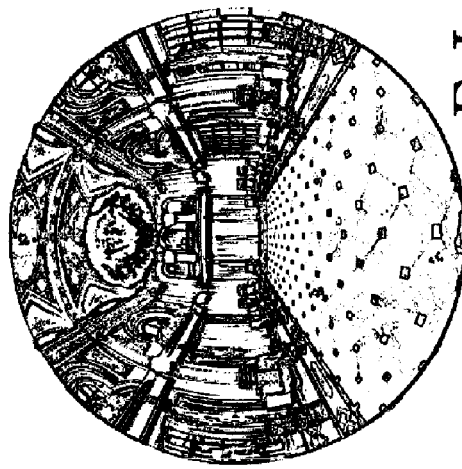
FIG.4A
FIG.4B
FIG.4C

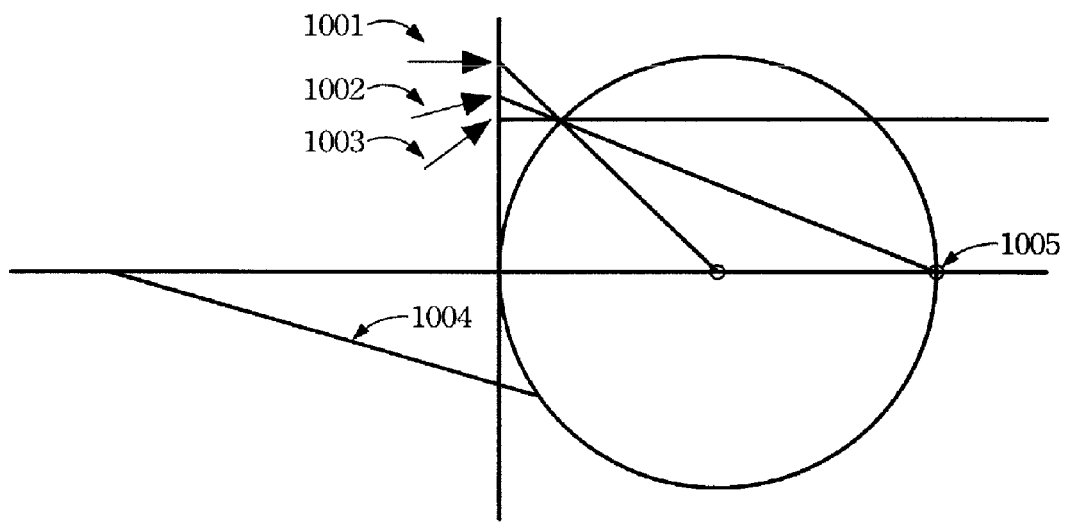
F I G. 10
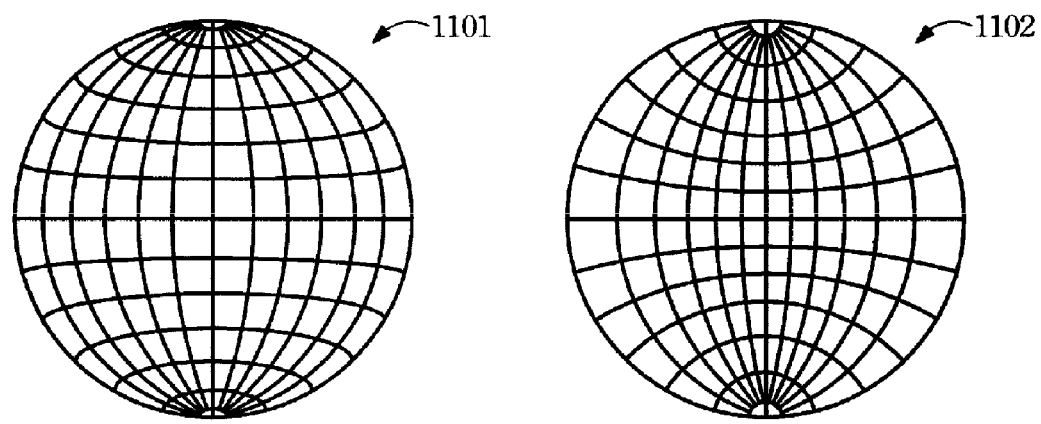
F I G. 11

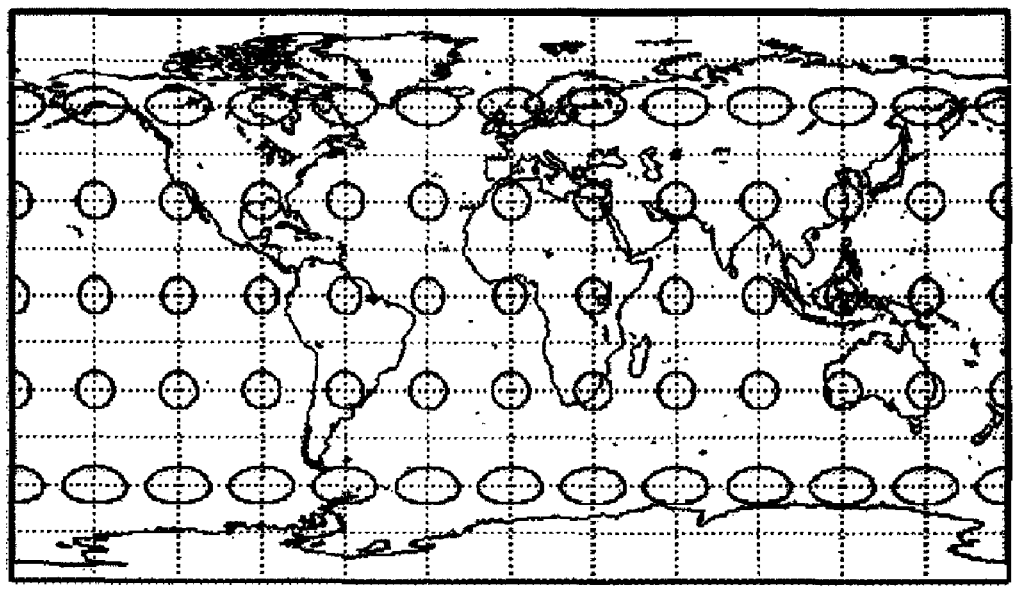
F I G. 16
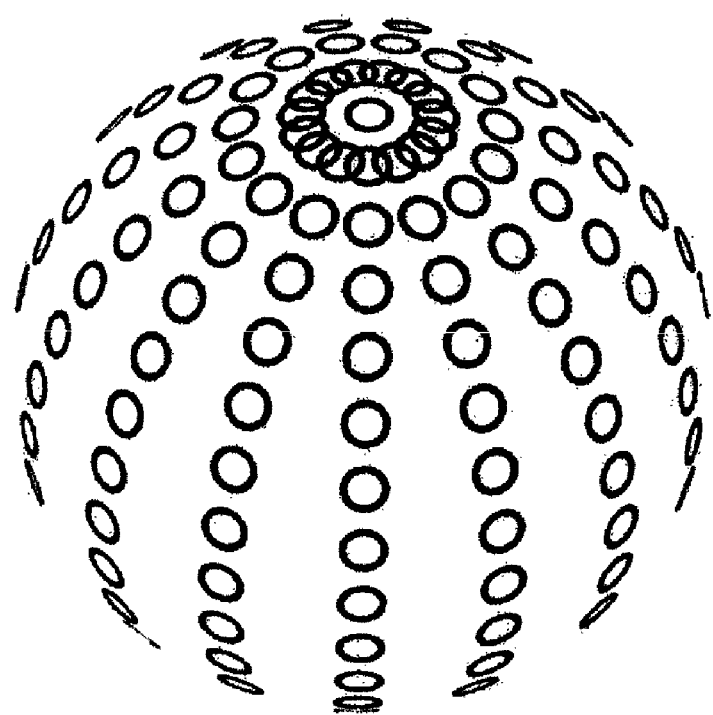
F I G. 17

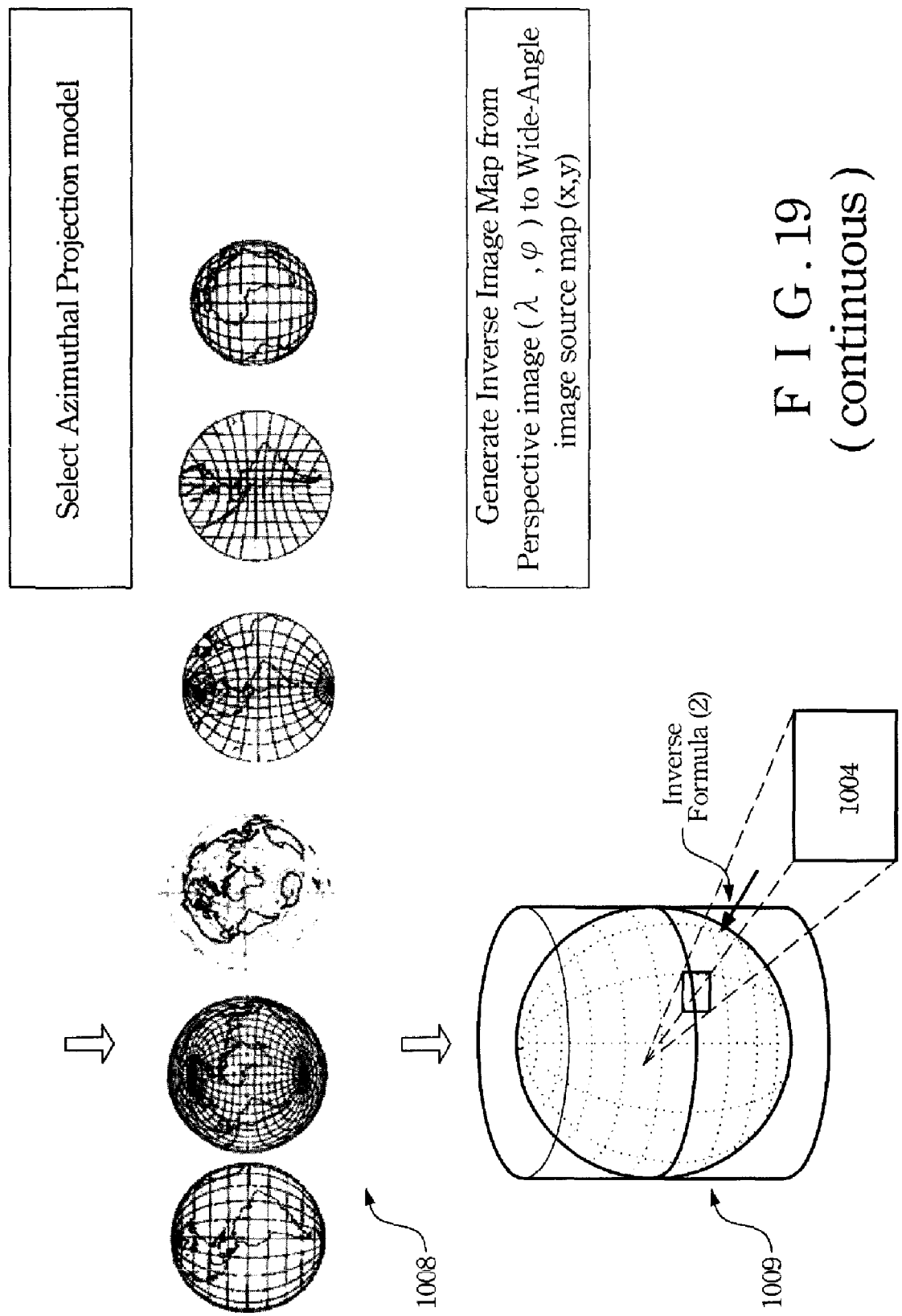
FIG. 19 (continuous)

METHOD FOR PROVIDING OUTPUT IMAGE IN EITHER CYLINDRICAL MODE OR PERSPECTIVE MODE

BACKGROUND OF THE INVENTION

1. Field of the Invention

The present invention generally relates to a method for providing an output image in either a Cylindrical mode or a Perspective mode, more particularly to a method that transforms an image in one of Azimuthal modes to an image in either a Cylindrical mode or a Perspective mode.

2. Description of the Prior Art

Image systems that utilize wide-angle lenses for quite a while, more particularly, a 180-degree fisheye lens is known in the art already. A fisheye lens generates images that are related to a hemisphere, a partially hemispherical, and field of view in those arts. That is, a wide-angle lens allowess a large viewing angle relative to views obtained by an ordinary camera lens. An image obtained by a wide-angle lens, however, contains radial barrel distortion as always.

In order to correct image distortion during image captured, most immersive viewers perform a geometric transformation process on a representation of the source images. This process of transforming distorted images to accurate Perspective images is referred to as "Perspective correction" or "dewarping". Perspective correction restores the scene to proper Perspective mode based upon the orientation by the image viewing position.

It is well document for method and device for selecting and undistorting the portion of a fisheye image. Such conventional method and device, however, suffer from a larger number of limitations. For example, (1) Hemisphere model is mathematically limited by 180 degrees. (2) Perspective view is with distortion increased when a viewing position approached to 180 degree. (3) It's impossible to generate 180 degree or above Perspective view. (4) Hemisphere is not good enough to describe a real fisheye lens or a wide-angle lens. (5) Perspective view presents an undistorted view of a portion of a fisheye image, they do not allow a viewer to observe simultaneously the relation of the undistorted view to entire image.

Accordingly, there is a need of adaptive method and apparatus for acquiring and viewing a wide-angle image that provides. (1) The limitation of the DOV of 180-degree Lens should be relax, more particularly, the lens degree of view is able to going up to 360 degrees. (2) Entire projection is from a wide-angle image. (3) An adaptive method is to describe the real wide-angle lens. (4) A projection could project an entire wide-angle image to an object image while distortion is corrected or reduced.

It is important to have a method for selecting and dewarping enhanced Images taken from a wideangle lens, especially a fisheye lens.

SUMMARY OF THE INVENTION

The primary objective of the present invention is to provide a method for providing an output image in either a Cylindrical mode or a Perspective mode, that is, a wide-angle video is transformed to a Perspective view or a Cylindrical video image with reduced distortion.

The method for providing an output image in either a Cylindrical mode or a Perspective mode, and comprising steps of: (1) acquiring a wide-angle image, which is a circular projection image, which format selected from the group of full circle, rounded rectangle, and full projection; (2) using a degree of view (DOV) and a radius of a projected circular region of the wide-angle image to select an image in one of Azimuthal modes; (3) specifying a horizontal field of view range (HFOVR) and a vertical field of view range (VFOVR) as a source projection image region, which is in Azimuthal mode; (4) converting the source projection image region in Azimuthal mode into a new source projection image region in Cylindrical mode; (5) converting the new source projection image in Cylindrical mode into another source projection image in Perspective mode; and (6) generating the output image.

However, the present invention relates to an apparatus, algorithms, and methods for transforming single distorted wide-angle image into single or several combined sub-images as an output video image. The sub-images is either reduced in distortion or corrected in Perspective mode compared with the eyes of a human being.

Other and further features, advantages and benefits of the invention will become apparent in the following description taken in conjunction with the following drawings. It is to be understood that the foregoing general description and following detailed description are exemplary and explanatory but are not to be restrictive of the invention. The accompanying drawings are incorporated in and constitute a part of this application and, together with the description, serve to explain the principles of the invention in general terms. Like numerals refer to like parts throughout the disclosure.

BRIEF DESCRIPTION OF THE DRAWINGS

The objects, spirits, and advantages of the preferred embodiments of the present invention will be readily understood by the accompanying drawings and detailed descriptions, wherein:

FIG. 1A-1 illustrates a schematic view of an Azimuthal projection in Polar aspect;

FIG. 1A-1' illustrates a schematic view of an Azimuthal projection in Equatorial aspect;

FIG. 1A-2 illustrates a schematic view of a tangent case of an Azimuthal to Cylindrical projection;

FIG. 1A-3 illustrates a schematic view of a secant case of an Azimuthal to Cylindrical projection;

FIG. 1B-1 illustrates a schematic view of a Polar projection;

FIG. 1B-2 illustrates a schematic view of an Equatorial projection;

FIG. 1B-3 illustrates a schematic view of an Oblique projection;

FIG. 1B-4 illustrates a schematic view of another viewing direction to FIG. 1A-2;

FIG. 1B-5 illustrates a schematic view of another viewing direction to FIG. 1A-3;

FIG. 2 is a table of wide-angle image comparing with variable Azimuthal modes in different degree of view (DOV) range;

FIG. 3 illustrates a schematic view of a Cylindrical to Azimuthal inverse map projection;

FIG. 4A illustrates a schematic view of a stretched wide-angle source image;

FIG. 4B illustrates a schematic view of an objected image;

FIG. 4C illustrates a schematic view of an objected image with a specified HFVOR and VFOVR;

FIG. 10 illustrates a schematic view of Azimuthal families having Perspective projections;

FIG. 11 illustrates schematic views of an Equal-area image in Azimuthal mode and an Equal-distance image in Azimuthal mode;

FIG. 16 illustrates a schematic view of a Cylindrical Equal-distance projection and Tissot distortion indicatrix;

FIG. 17 illustrates a schematic view of a concept developed by Nicolas Auguste Tissot to measure and map distortions;

DETAILED DESCRIPTION OF THE INVENTION

Figure 1A:
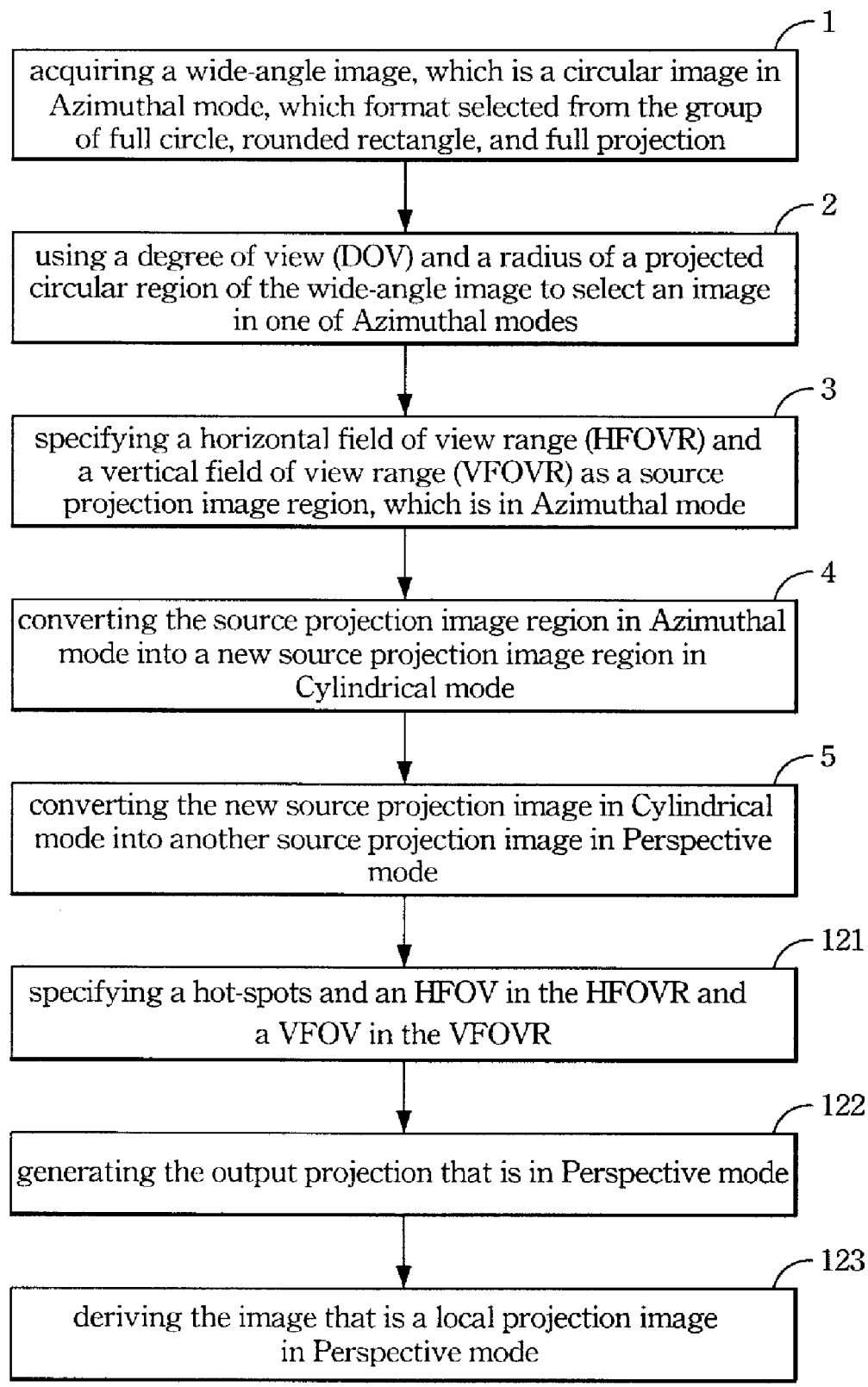
FIG. 1A-1F illustrate schematic views of six preferred embodiments of the method of the present invention.
Figure 1B:
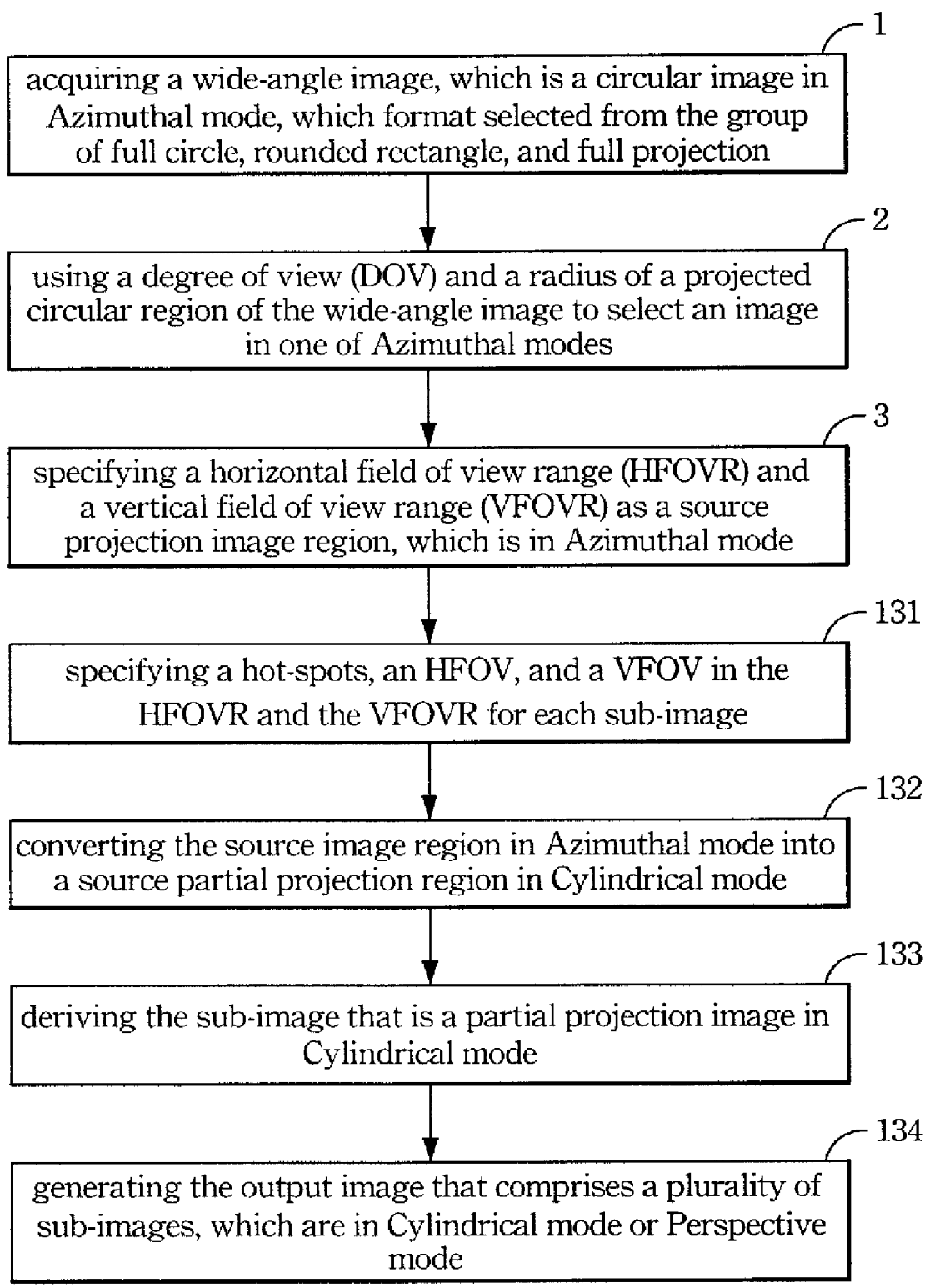
Figure 1C:
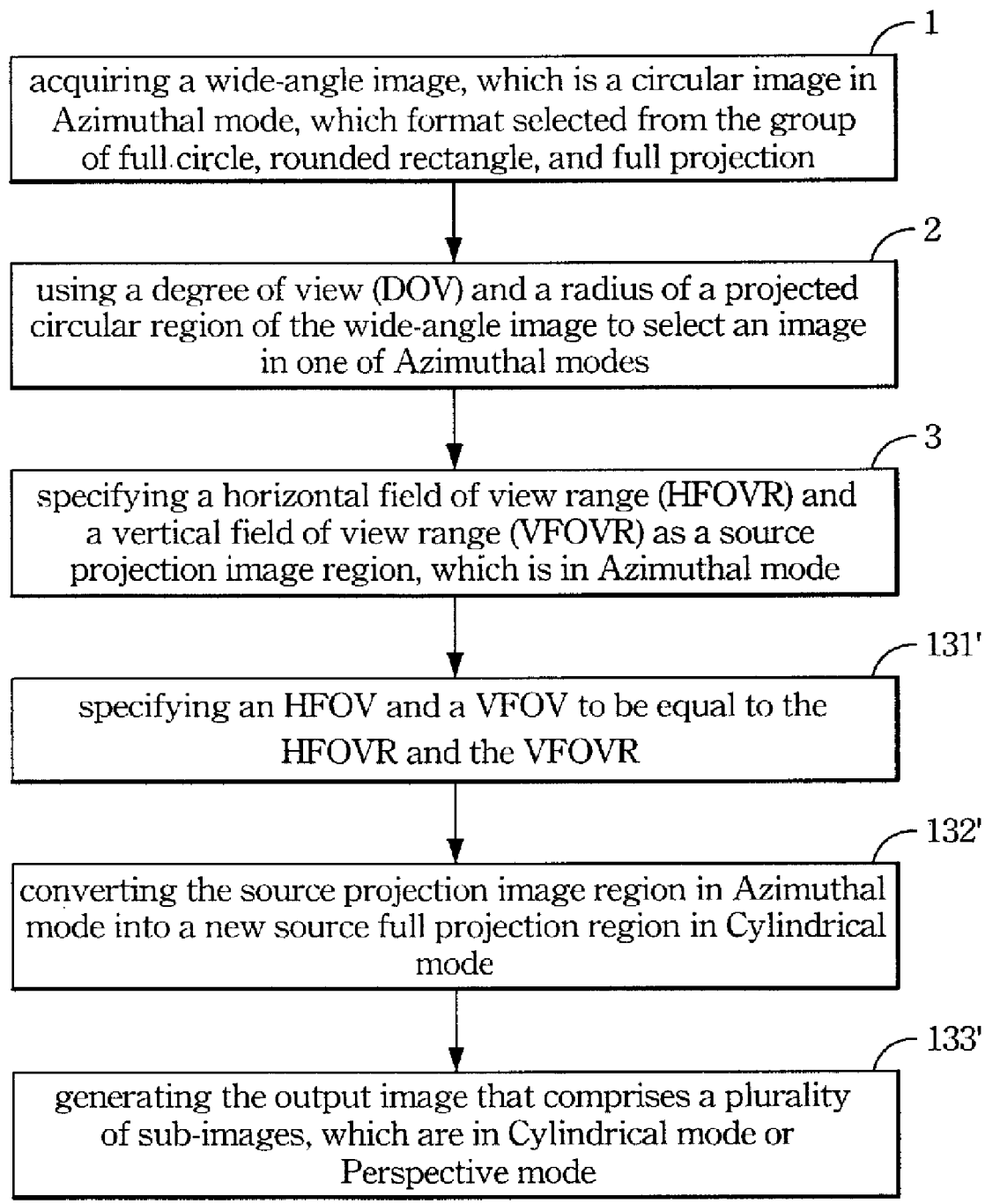
Figure 1D:
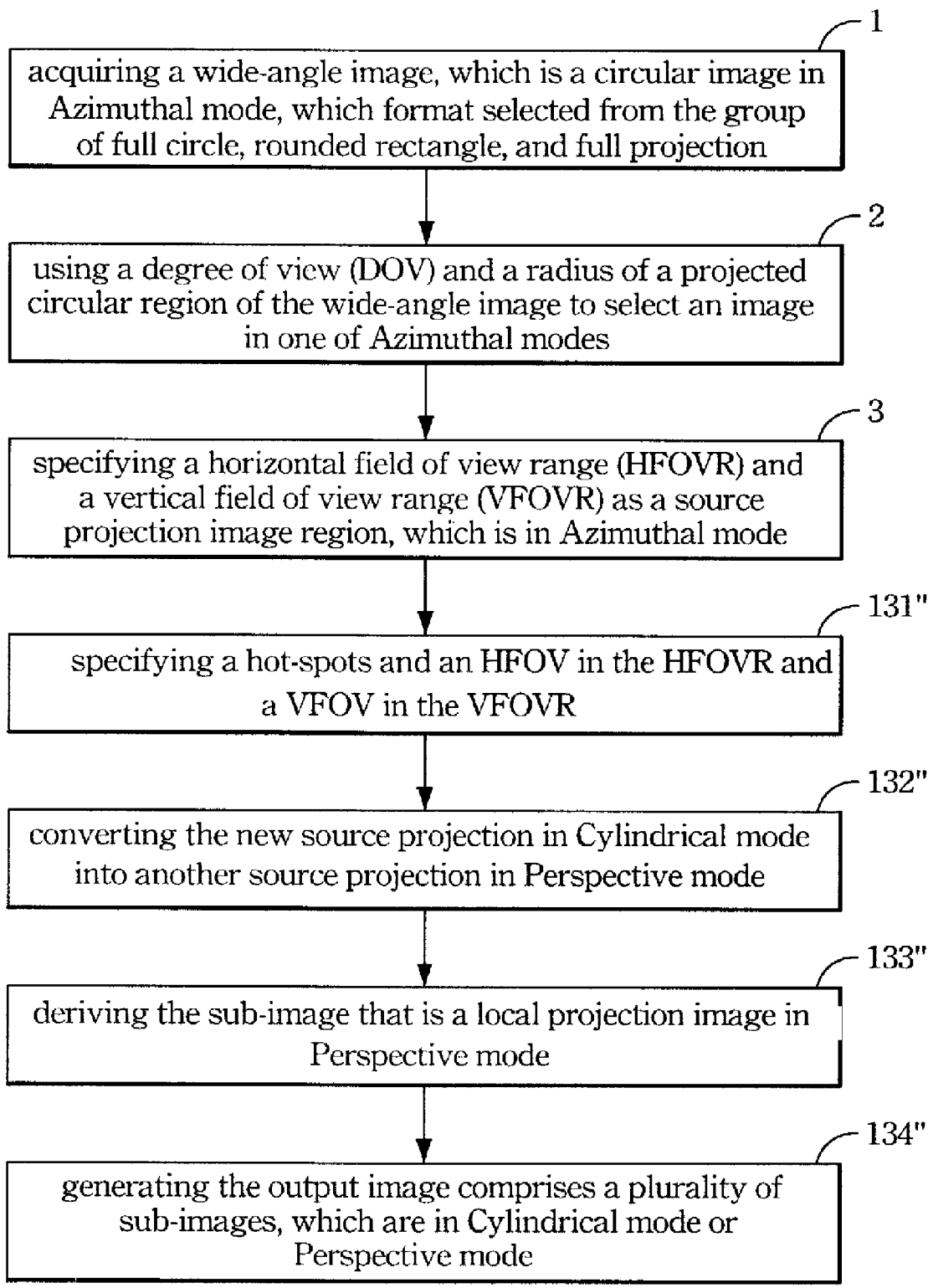
Figure 1E:
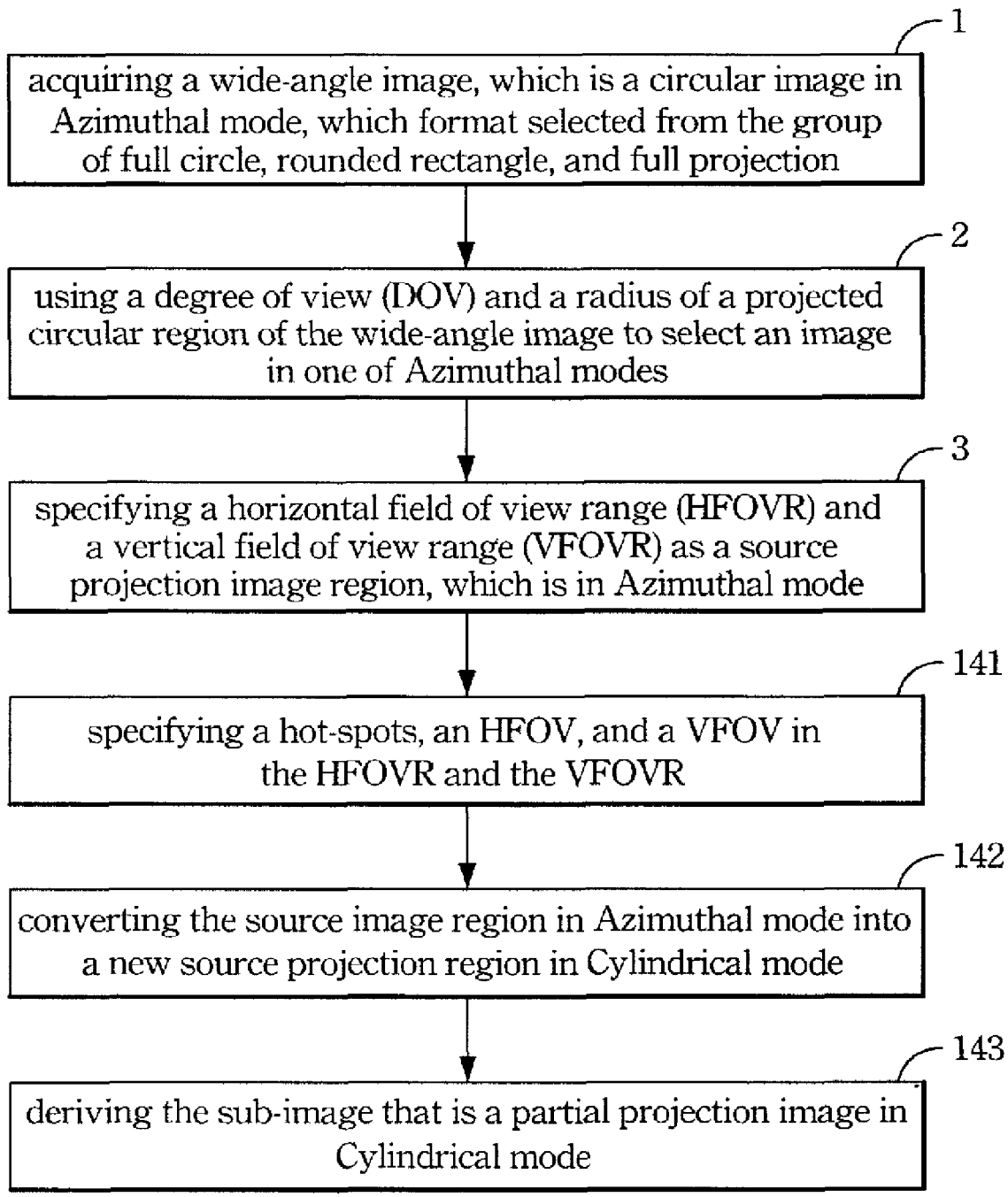
Figure 1F:
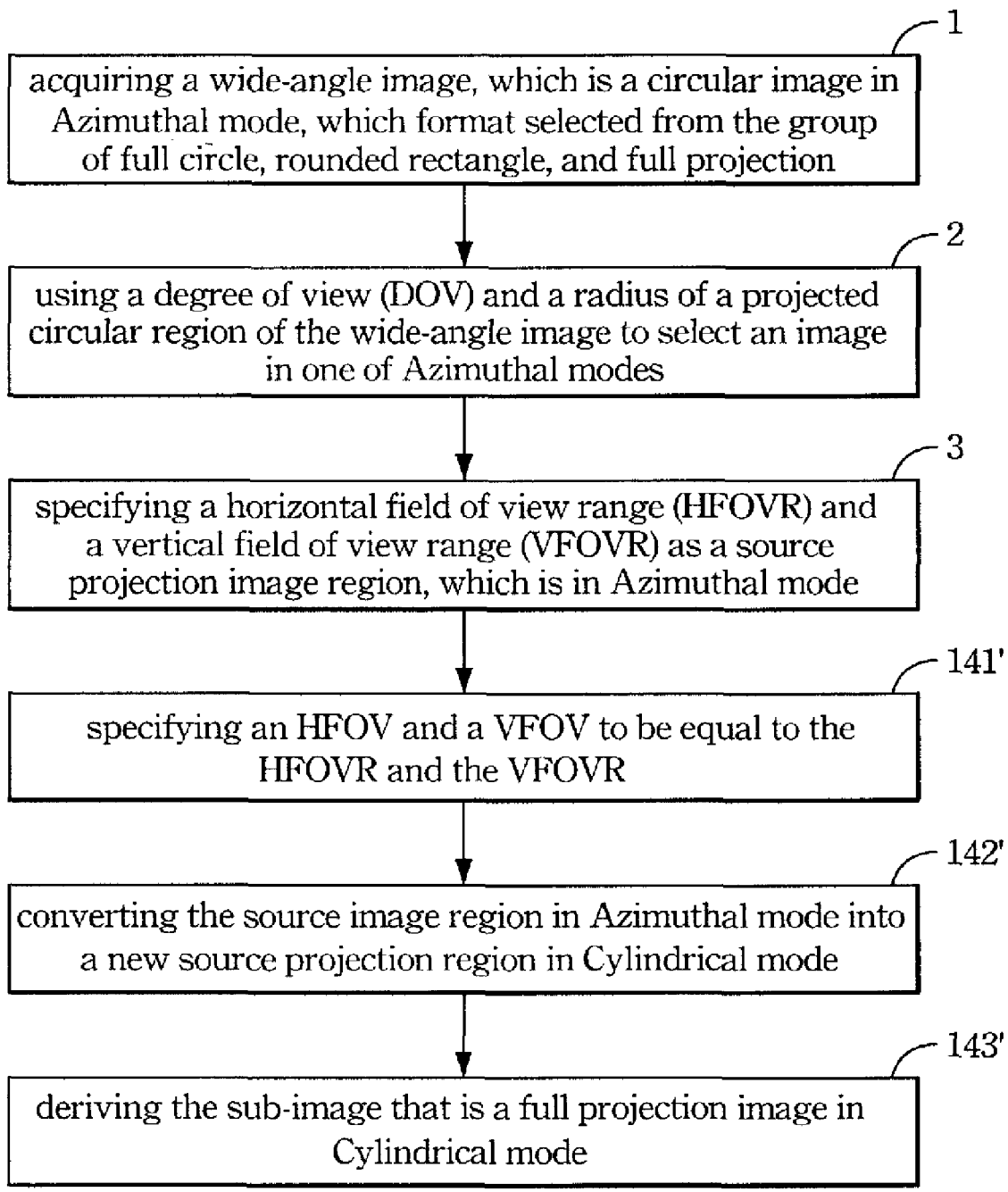
Figures 1, 1A, 2:
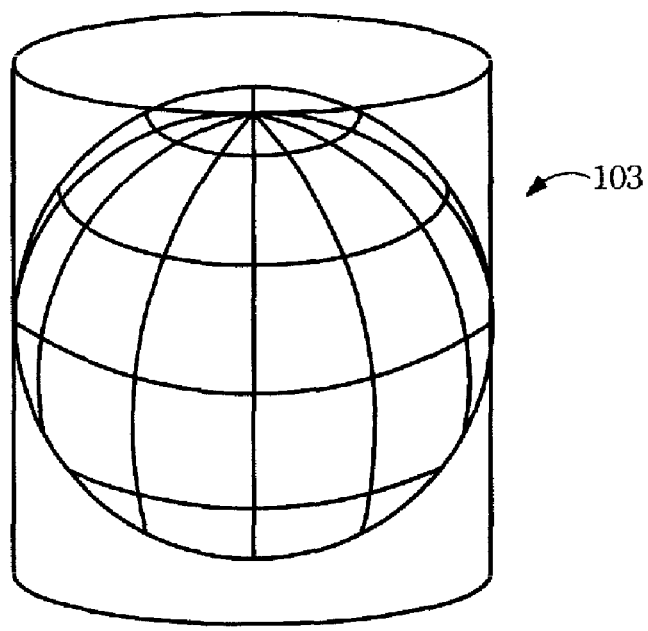

The present invention is related to an image generated by a wide-angle lens, the image can be of a spheroid 101' being projected onto a flat surface 102', which is usually tangent to the spheroid 101', as shown in FIG. 1A-1, FIG. 1A-1', FIG. 1A-2, FIG. 1B-4, but sometimes is secant, as shown in FIG. 1A-3 and FIG. 1B-5. These projections are also as Azimuthal or zenithal projection. The point of tangency specifies the aspect of the projection. Functionally, the aspect serves as the focus of the projection. Regular aspects for planar projections are a Polar projection 121, an Equatorial projection 122, and an Oblique projection 123, as shown in FIG. 1B-1, FIG. 1B-2, and FIG. 1B-3. The present invention defines that the wide-angle image is projected by way of Azimuthal modes, such as orthographic projection, stereographic projection, gnomonic projection, equal-distance projection, equal-area projection, and vertical Perspective projection, as shown in FIG. 2, and easily extent to all types of Azimuthal modes.

Figures 1, 1A, 2, 3:
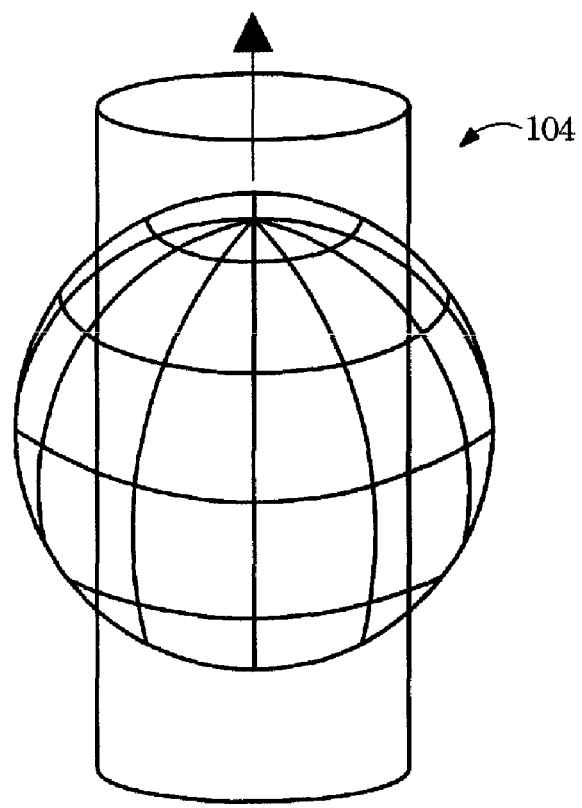
Figure 3:
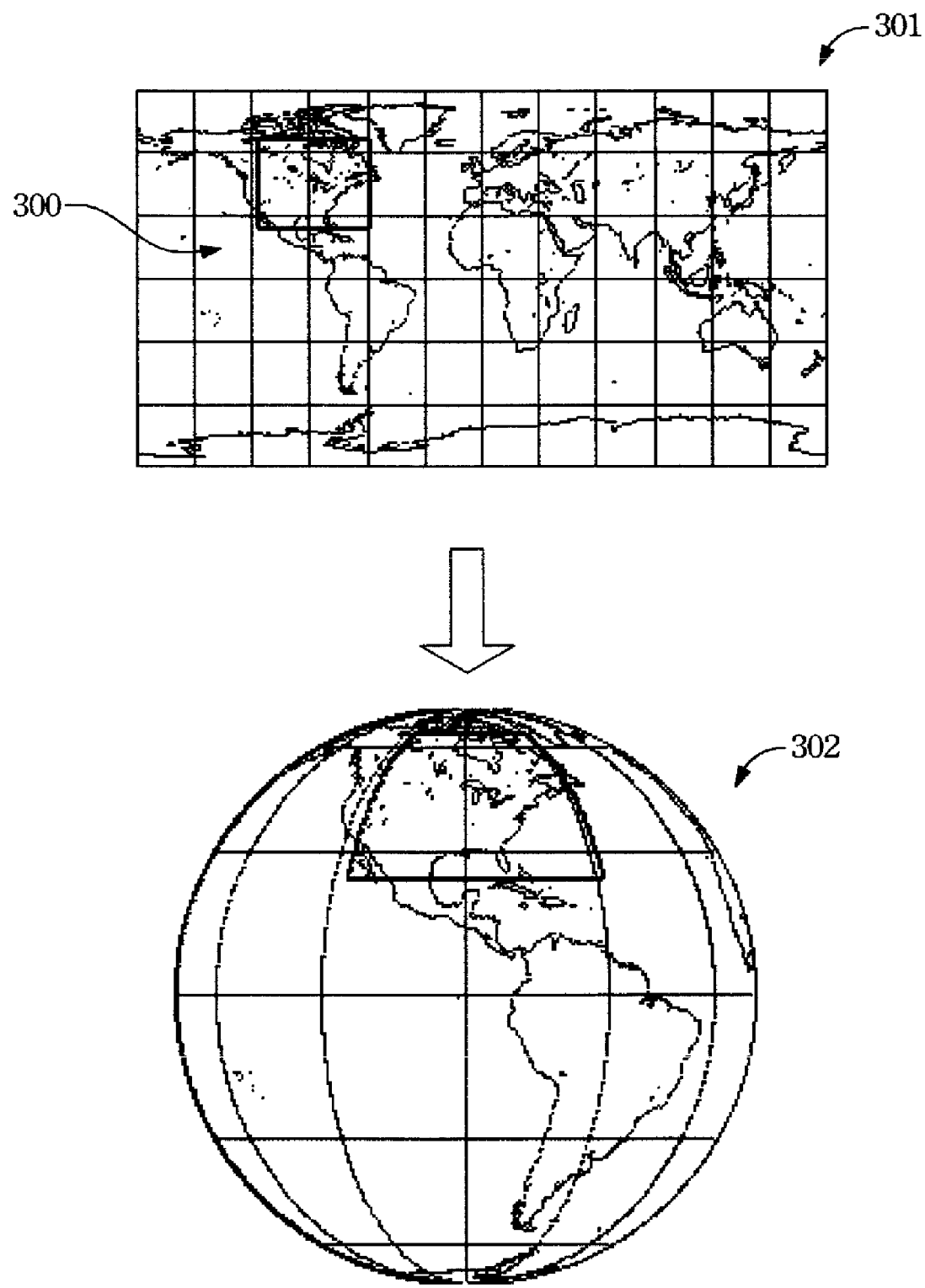

Projection between the Azimuthal mode and the Cylindrical mode can be defined by two sets of mapping equations. The first set is a forward equation or direct relation, which converts the polar coordinates (longitude $\lambda$, latitude $\phi$, radius R) to the Cartesian coordinates (horizontal distance x from origin, vertical distance y), and provides a convenient scaling factor, which is not the same as the map scale. Equations included here assume a unitary scaling factor. The second set is an inverse equation, which is an opposite transformation corresponding to the first set. An inverse map 300 is converted from an image 301 in Cylindrical coordinate ($\lambda$, $\phi$) into an image 302 in Azimuthal coordinate (x, y), as shown in FIG. 3. The present invention adopts an inverse equation only.

Figure 5B:
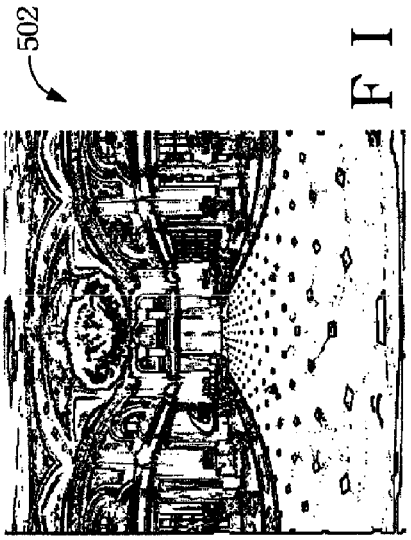
FIGS. 5A, 5B, 5C, and 5D depict four views represented by three controllers and one Cylindrical projection.
Figure 5A:
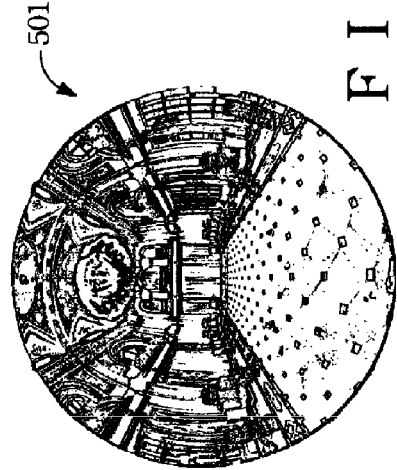
Figure 5D:
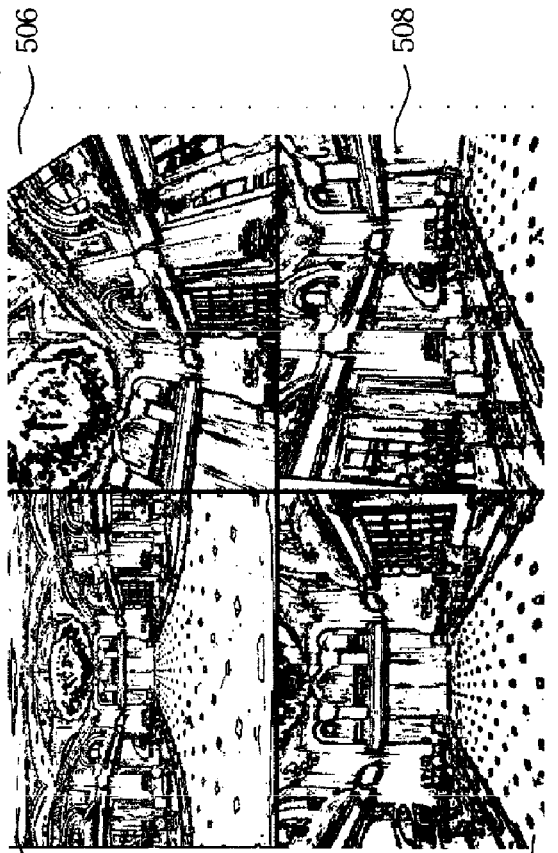
Figure 5C:
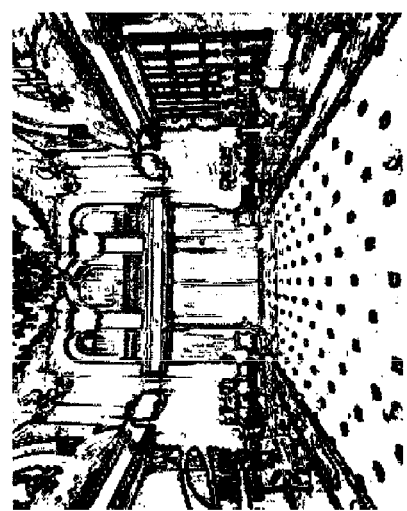

Since the wide-angle video image has a severe barrel deformation caused by the increment of a DOV (degree of view) comparing with a non-wide-angle video image. The deformation is center-symmetric on a plane image and axis-symmetric on a spherical surface, as shown in FIG. 4A and FIG. 5A. Hence, a method to recover the deformed wide-angle image is a must with the broad applications of the wide-angle lens.

The present invention totally employs three different projections to derive object images. Firstly, the wide-angle video image is an Azimuthal projection (said Azimuthal mode) video image. Through the three projections, object images with different angles and optical characteristics are then derived, such as Cylindrical projection (said Cylindrical mode) video image or Perspective projection (said Perspective mode) video image. The three modes are described in detail as below.

Figure 6:
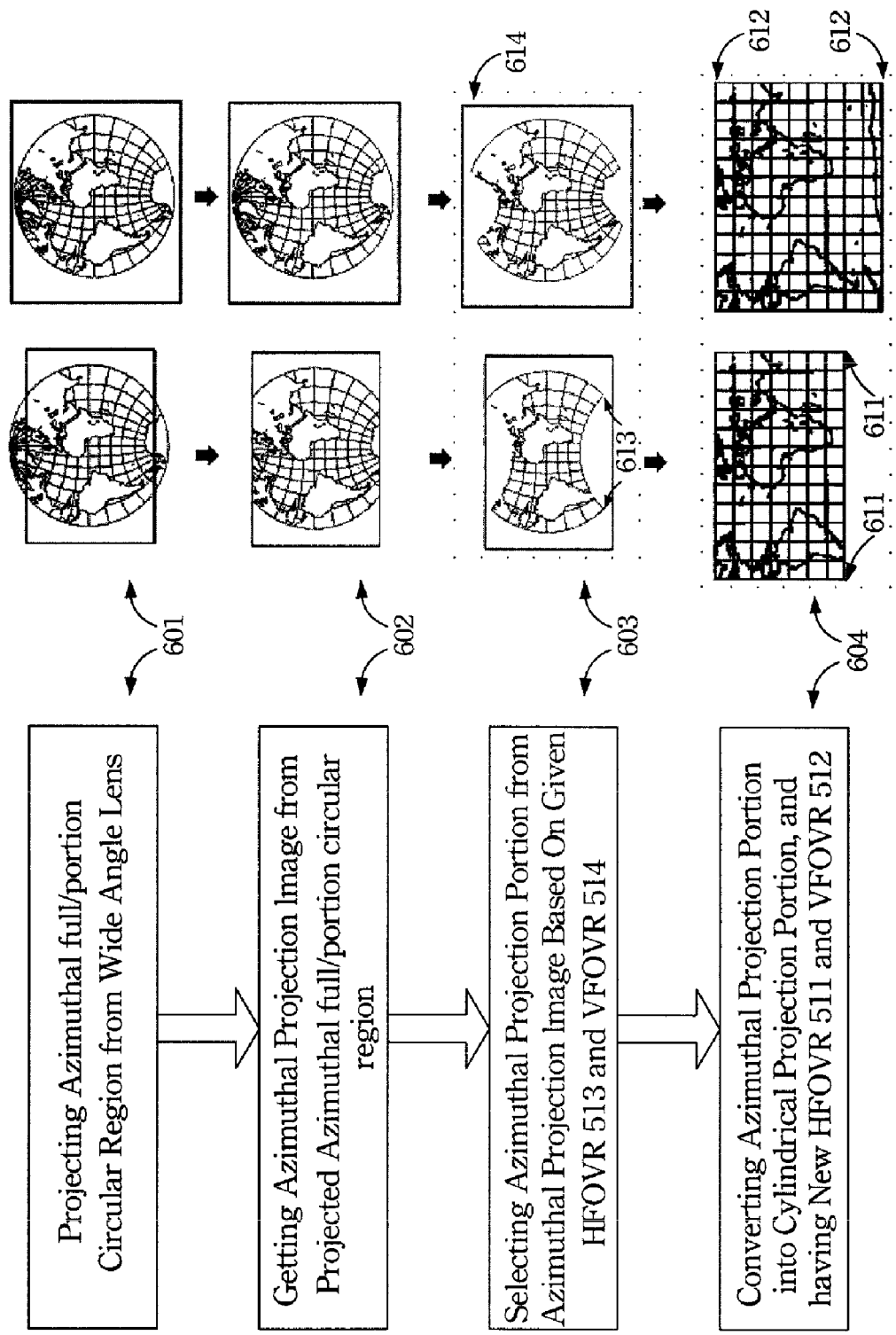
FIG. 6 illustrates a schematic view of sequential diagrams of transforming a video image in Azimuthal mode to a video image in Cylindrical mode.

Mode (1): This is to transform a video image in Azimuthal mode to a video image in. Cylindrical mode: The FOVRs (field of view range) 611, 612, 613, and 614 as shown in FIG. 6 utilize the characteristics of the projected image in Cylindrical mode to acquire each pixel (x, y), which has the values of longitude $\lambda$ and latitude $\phi$. Wherein F1$\lambda$(x, y) and F1$\phi$(x, y) are the equations corresponding to the longitude value $\lambda$ and the latitude value $\phi$ in each pixel (x, y). The relationships for the two equations are:

$$\lambda[x,y]=F1\lambda(x,y) \quad (1\text{-}1), \text{ and}$$

$$\phi[x,y]=F1\phi(x,y) \quad (1\text{-}2),$$

where x and y are the planar, Cartesian coordinates, in each Cylindrical image pixels, and $\lambda$ and $\phi$ are the respective longitude and latitude geographic coordinates in radians.

Mode (2): This projection adopts the video image in Cylindrical mode from mode 1 to be an image source, and then uses a local image Perspective view technique to derive an output video image 1003, as shown in FIG. 20. From the equations (1-1) and (1-2), each point can be represented as ($\lambda$, $\phi$) and obtained and listed as below:

$$\lambda[x,y]=F2\lambda(x,y) \quad (2\text{-}1), \text{ and}$$

$$\phi[x,y]=F2\phi(x,y) \quad (2\text{-}2),$$

where F2$\lambda$(x, y) and F2$\phi$(x, y) derivated the corresponding longitude value $\lambda$ and the latitude value $\phi$ in each pixel (x, y).

Mode (3): Compared to mode (1), this projection uses an inverse mapping projection, as shown in FIG. 3, to transform the image 301 into the image 302. The image source of mode (3) adopts the Perspective image from mode (2). Each pixel of the Perspective image is corresponding to the longitude value $\lambda$ and the latitude value $\phi$ of the Azimuthal image. There are two inverse equations F3x($\lambda$p, $\phi$p) and F3y($\lambda$p, $\phi$p) listed below:

Given a specified point ($\lambda$p, $\phi$p) from an image in Cylindrical mode, hence a corresponding video image position (x, y) in Azimuthal mode can be determined as below:

$$x[\lambda p,\phi p]=F3x(\lambda p,\phi p) \quad (3\text{-}1), \text{ and}$$

$$y[\lambda p,\phi p]=F3y(\lambda p,\phi p) \quad (3\text{-}2),$$

where x and y are corresponding to the planar, Cartesian coordinates, in Azimuthal mode video image, and equations (3-1), (3-2) represent the inverse mappings of the video image in Cylindrical mode to the video image in Azimuthal mode.

Figure 8:
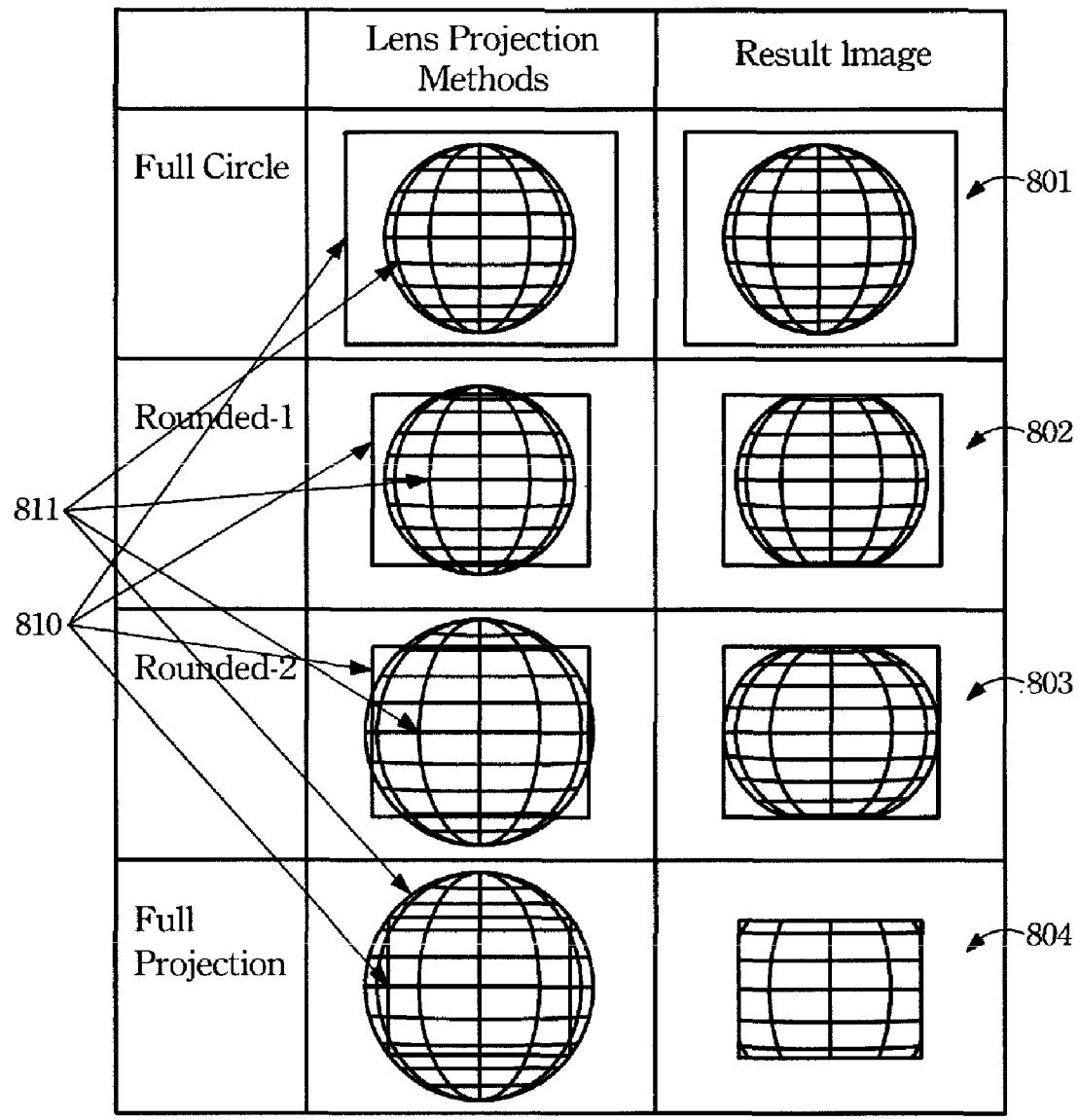
FIG. 8 is a table of possible lens projection types and result image shapes.

The present invention provides a method for obtaining wide-angle images and generating a Perspective view from a selected area or a distortion-reduced full view to be as an object image. Referring now to the series of FIG. 1, which illustrates a schematic view of a flow chart of the present invention. The method includes the steps of:
(1) acquiring a wide-angle image, which is a circular image in Azimuthal mode, which format selected from the group of full circle, rounded rectangle, and full projection, as shown in FIG. 8;
(2) using a degree of view (DOV) and a radius of a projected circular region of the wide-angle image to select an image in one of Azimuthal modes;
(3) specifying a horizontal field of view range (HFOVR) and a vertical field of view range (VFOVR) as a source projection image region, which is in Azimuthal mode;
(4) converting the source projection image region in Azimuthal mode into a new source projection image region in Cylindrical mode;
(5) converting the new source projection image in Cylindrical mode into another source projection image in Perspective mode; and
(6) generating the output image.

Preferably, as shown in FIG. 1A, while the output image is an image in Perspective mode, further steps after the step (5) are:
(121) specifying a hot-spots and an HFOV in the HFOVR and a VFOV in the VFOVR;
(122) generating the output projection that is in Perspective mode; and
(123) deriving the image that is a local projection image in Perspective mode.

Preferably, as shown in FIG. 1B, while the output image comprises a plurality of sub-images, which are in Cylindrical mode or Perspective mode, further steps after the step (3) are:
(131) specifying a hot-spots, an HFOV, and a VFOV in the HFOVR and the VFOVR for each sub-image;
(132) converting the source image region in Azimuthal mode into a new source partial projection region in Cylindrical mode;
(133) deriving the sub-image that is a partial projection image in Cylindrical mode; and
(134) generating the output image that comprises a plurality of sub-images, which are in Cylindrical mode or Perspective mode.

Preferably, as shown in FIG. 1C, while the output image comprises a plurality of sub-images, which are in Cylindrical mode or Perspective mode, further steps after the step (3) are:
(131') specifying an HFOV and a VFOV to be equal to the HFOVR and the VFOVR;
(132') converting the source projection image region in Azimuthal mode into a new source full projection region in Cylindrical mode; and
(133') generating the output image that comprises a plurality of sub-images, which are in Cylindrical mode or Perspective mode.

Preferably, as shown in FIG. 1D, while the output image comprises a plurality of sub-images, which are in Cylindrical mode or Perspective mode, further steps after the step (4) are:
(131") specifying a hot-spots and an HFOV in the HFOVR and a VFOV in the VFOVR; (132") converting the new source projection in Cylindrical mode into another source projection in Perspective mode;
(133") deriving the sub-image that is a local projection image in Perspective mode; and
(134") generating the output image comprises a plurality of sub-images, which are in Cylindrical mode or Perspective mode.

Preferably, as shown in FIG. 1E, while the output image is an image in Cylindrical mode, further steps after the step (3) are:
(141) specifying a hot-spots, an HFOV, and a VFOV in the HFOVR and the VFOVR;
(142) converting the source image region in Azimuthal mode into a new source projection region in Cylindrical mode; and
(143) deriving the sub-image that is a partial projection image in Cylindrical mode.

Preferably, as shown in FIG. 1F, while the output image is an image in Cylindrical mode, further steps after the step (3) are:
(141') specifying an HFOV and a VFOV to be equal to the HFOVR and the VFOVR;
(142') converting the source image region in Azimuthal mode into a new source projection region in Cylindrical mode; and
(143') deriving the sub-image that is a full projection image in Cylindrical mode.

A digital video image camera having a wide-angle lens or a fisheye lens is directed to acquire a real-world scene. The digitized video image signal with a specified wide-angle lens degree of view (DOV) is thus transformed. With reference to FIG. 8, the projection methods result in different images, such as a full circular image 801, rounded rectangle images 802 and 803 and a full projection image 804, which are on to an optical CCD/CMOS sensor 810. The source image can be as one projection from one of Azimuthal projection areas 811 in Azimuthal mode. A plurality of Azimuthal projections as the projection of the Azimuthal in Polar aspect, as shown in FIG. 1A-1, the projection of the Azimuthal in Equatorial aspect, as shown in FIG. 1A-1', and the Azimuthal projection areas 411 are the projections with respect to the spheroid 101', and the azimuths of all projection points are correct for the center of the spheroid 101'. The azimuth can be represented by a central reference point and the radian values of longitude and latitude.

There are some types of Azimuthal aspects, and the placement of a projection system is relative to the spherical axis. The types of Azimuthal aspects are the polar aspect, as shown in FIG. 1A-1 and FIG. 1B-1, the Equatorial aspect, as shown in FIG. 1A-1' and FIG. 1B-2, and another oblique aspect, as shown in FIG. 1A-2, FIG. 1A-3, FIG. 1B-3, FIG. 1B-4, and FIG. 1B-5. The polar aspect is tangent at the pole of the spheroid 101'. The equatorial aspect is tangent at the equator of the spheroid 101'. The oblique aspect is tangent anywhere else. The preferred embodiment of the present invention is the equatorial aspect. Arimuthal projections in the present invention have the following properties: (a) The standard point acts as a focus for projection when describing an Azimuthal projection, a central latitude and longitude can be specified. (b) A 90-degree intersection of a graticule 105, as shown in FIG. 1A-1, lines at the center point, where a grid of parallels and meridians shown as lines on a map is called a graticule. (c) All directions from the center point are true directions, as shown in FIG. 8. (d) The patterns of distortion are circular around the center point.

Figure 9:
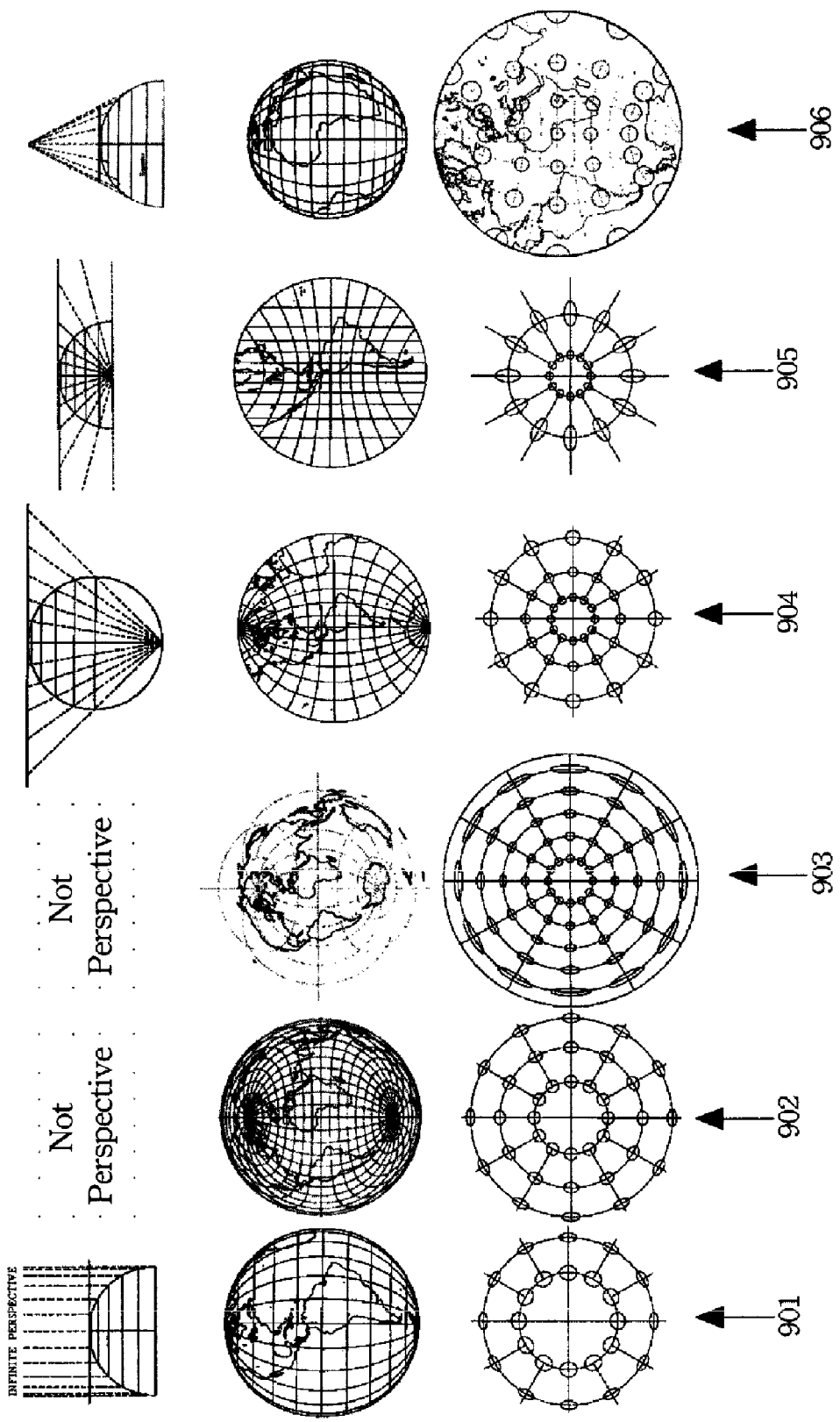
FIG. 9 is a table of Azimuthal families and Tissot distortion indicatrix.
Figure 12:
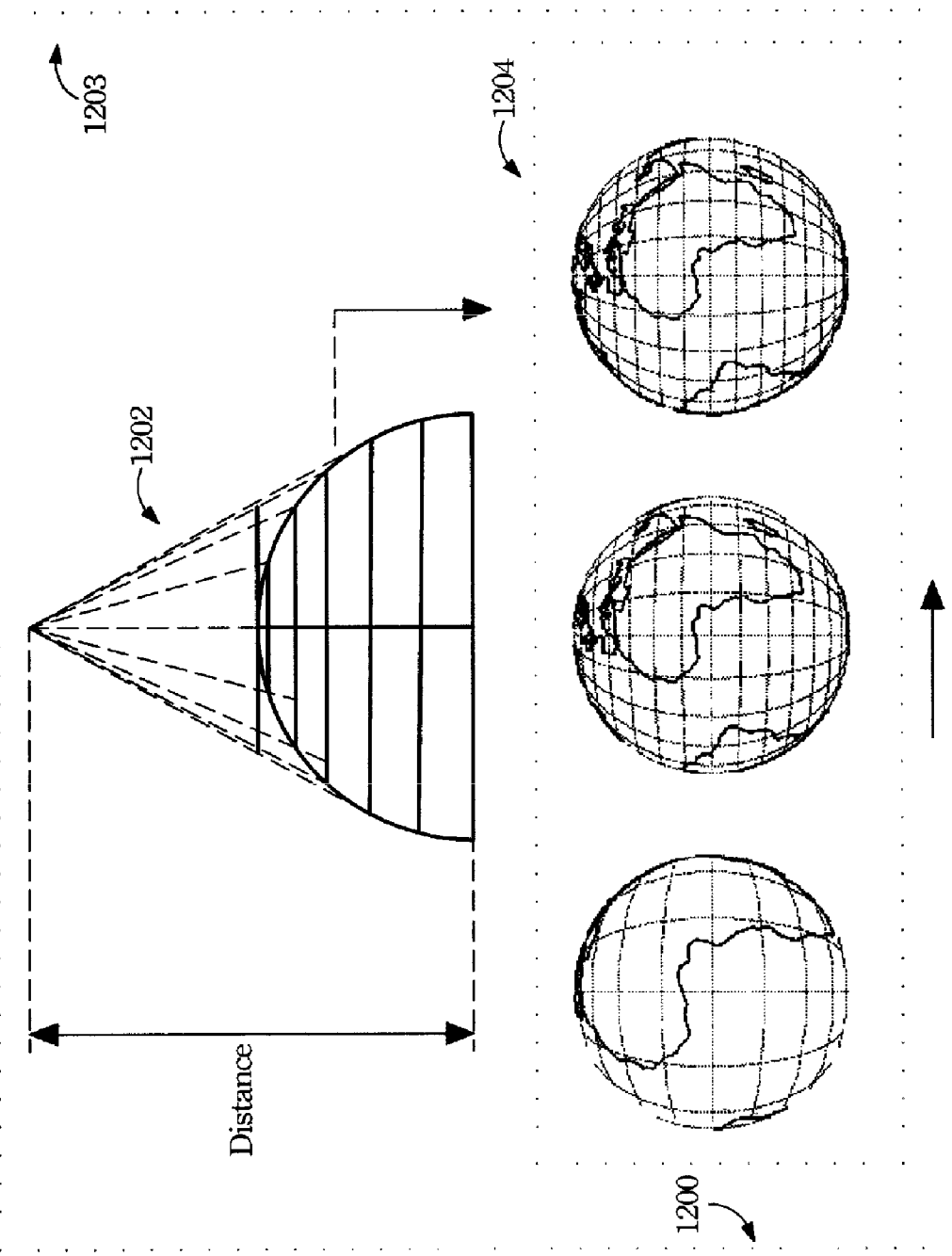
FIG. 12 illustrates a schematic view of a plurality of Stereographic projections.

The present invention employs several models in Azimuthal mode as source input video images: (a) Orthogonal projections 901 and 1003, as shown in FIG. 9 and FIG. 10. (b) Equal-area projections 902 and 1101, as shown in FIG. 9 and FIG. 11. (c) Equal-distance Azimuthal projections 903 and 1102, as shown in FIG. 9 and FIG. 11. (d) Stereographic projections 904, 1002, and 1200, as shown in FIG. 9, FIG. 10, and FIG. 12. (e) Gnomonic projections 905 and 1001, as shown in FIG. 9 and FIG. 10. (f) Vertical Perspective projections 1004, as shown in FIG. 10. Such projections can be generalized to all other Azimuthal modes, if the inverse equations (3-1) and (3-2) are derived.

The input unit gives the HFOVR (horizontal field of view range) 611 and VFOVR (vertical field of view range) 612, as shown in FIG. 6, for target object image(s) based on the true position of an image projected on a CCD/CMOS, the DOV properties of a lens, and the projection types, as shown in FIG. 8, the output object image in Azimuthal mode is limited by HFOVR and VFOVR. A Cylindrical mode is the projection where the spherical surface is projected onto a tangent cylinder surface 103, as shown in FIG. 1A-2, or a secant cylinder surface 104, as shown in FIG. 1A-3, the tangent cylinder surface 103 or secant cylinder surface 104 is then spread out as a flat surface.

Figure 7:
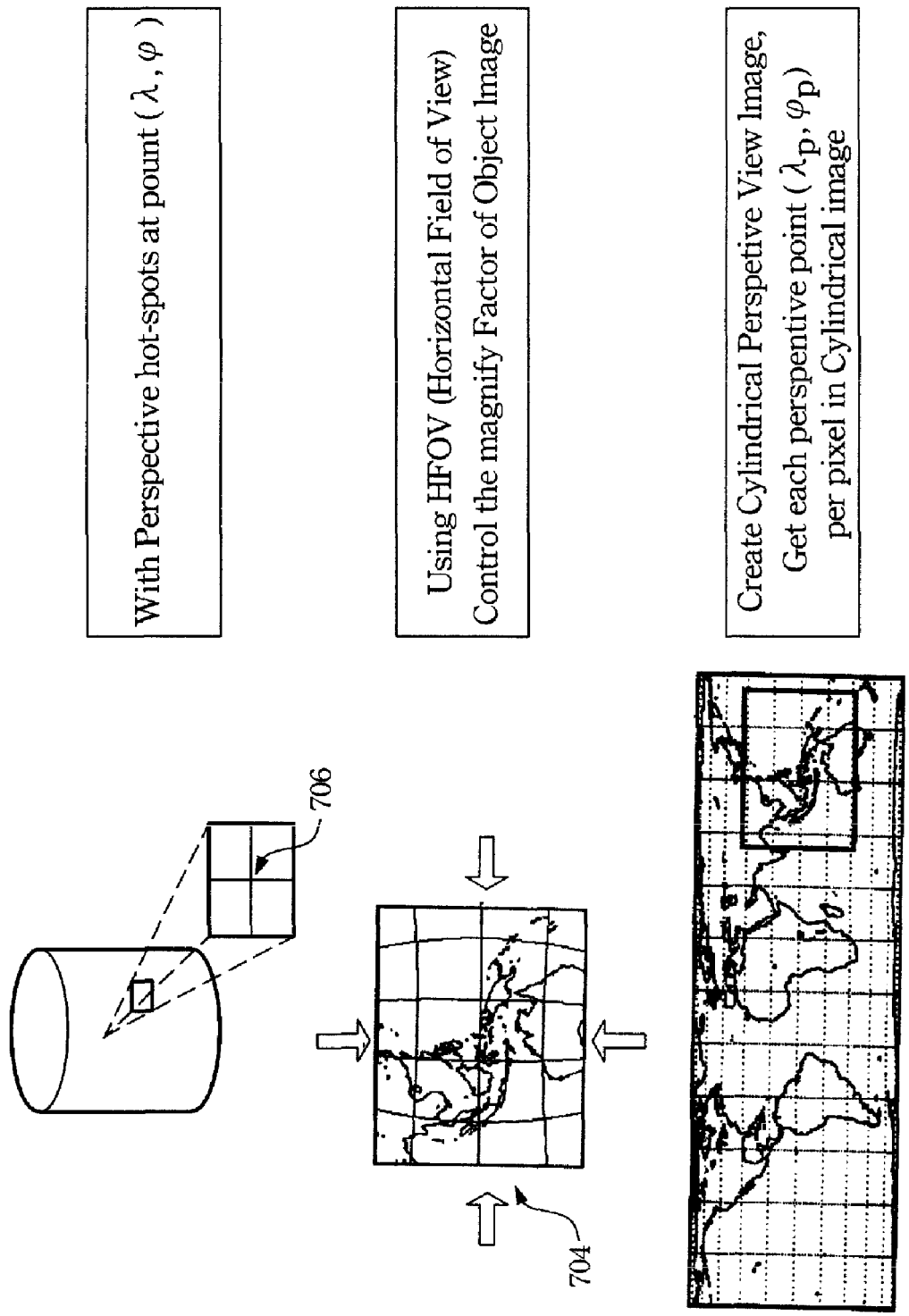
FIG. 7 illustrates a schematic view of using a map projection technology to derive a corresponding new Cylindrical image.

While the HFOVR 611, the VFOVR angle 612, as shown in FIG. 6, and a Hot-Spots 706, as shown in FIG. 7, are given, a corresponding new Cylindrical image can then be derived by using a map projection technology. Cylindrical mode is then named because the surface of projection is a cylinder, such as the tangent cylinder surface 103, as shown in FIG. 1A-2, or the secant cylinder surface 104, as shown in FIG. 1A-3. The native coordinate system is chosen to have its polar axis coincident with the axes of the spheroid 101', the cylinder surface 103. Meridians and parallels are mapped onto a rectangular graticule 105 so that Cylindrical projections are described by equations, which return (x, y) in Cartesian coordinate. Since all Cylindrical projections are constructed with the native coordinate system at a reference point, the present invention defines:

$$(\lambda 0, \phi 0) \text{Cylindrical} = (0,0) \quad (5\text{-}1)$$

With reference to FIG. 6, which illustrates a schematic view of a first preferred embodiment of the present invention. The first preferred embodiment includes partial steps to FIG. 1. The first preferred embodiment includes the steps of: (601) projecting an Azimuthal full/portion circular region from a wide-angle lens; (602) getting an Azimuthal projection image in Azimuthal mode from the projected Azimuthal full/portion circular region; (603) selecting an Azimuthal portion from the Azimuthal projected image in Azimuthal mode based on the given HFOVR 613 and the given VFOVR 614; and (604) converting the Azimuthal projected portion in Azimuthal mode into a Cylindrical projected portion in Cylindrical mode, the projected portion in Cylindrical mode has the new HFVOR 611 and the new VFOVR 612. The Cylindrical projected portion in Cylindrical mode is reduced in the aspect of distortion comparing to the original Azimuthal full/portion circular region. User can also select a set of longitude and latitude within HFOVR and VFOVR and a specified Hot-Spots to have the feature of PAN-TILT-ZOOM.

With reference to FIG. 2, a perfect Wide-Angle lens, more particularly to a perfect Fisheye lens, should be with the properties as below: (1) the projected image in a mirror is center-symmetric; (2) the radial distance along the image plane from the origin to the projection of an object point is linearly proportional to the angle between a perpendicular line through the origin of the image plane and a line from the origin to the object point. This implies that a perfect wide-angle lens samples the scene uniformly. In another word, a pixel at the centre of the image is the same as a pixel at the edge of the image.

Unfortunately, different Wind-Angle lenses have different properties. These include lens DOV (lens degree of view) and projection characteristics. More barrel distortion comes when DOV is increasing. Azimuthal Gnomonic and Stereographic projections are the best modes to simulate real wide-angle lens in the aspects of optics and physics. But each mode has limitations thereof in different ranges of DOV, as shown in FIG. 2.

Figure 13:
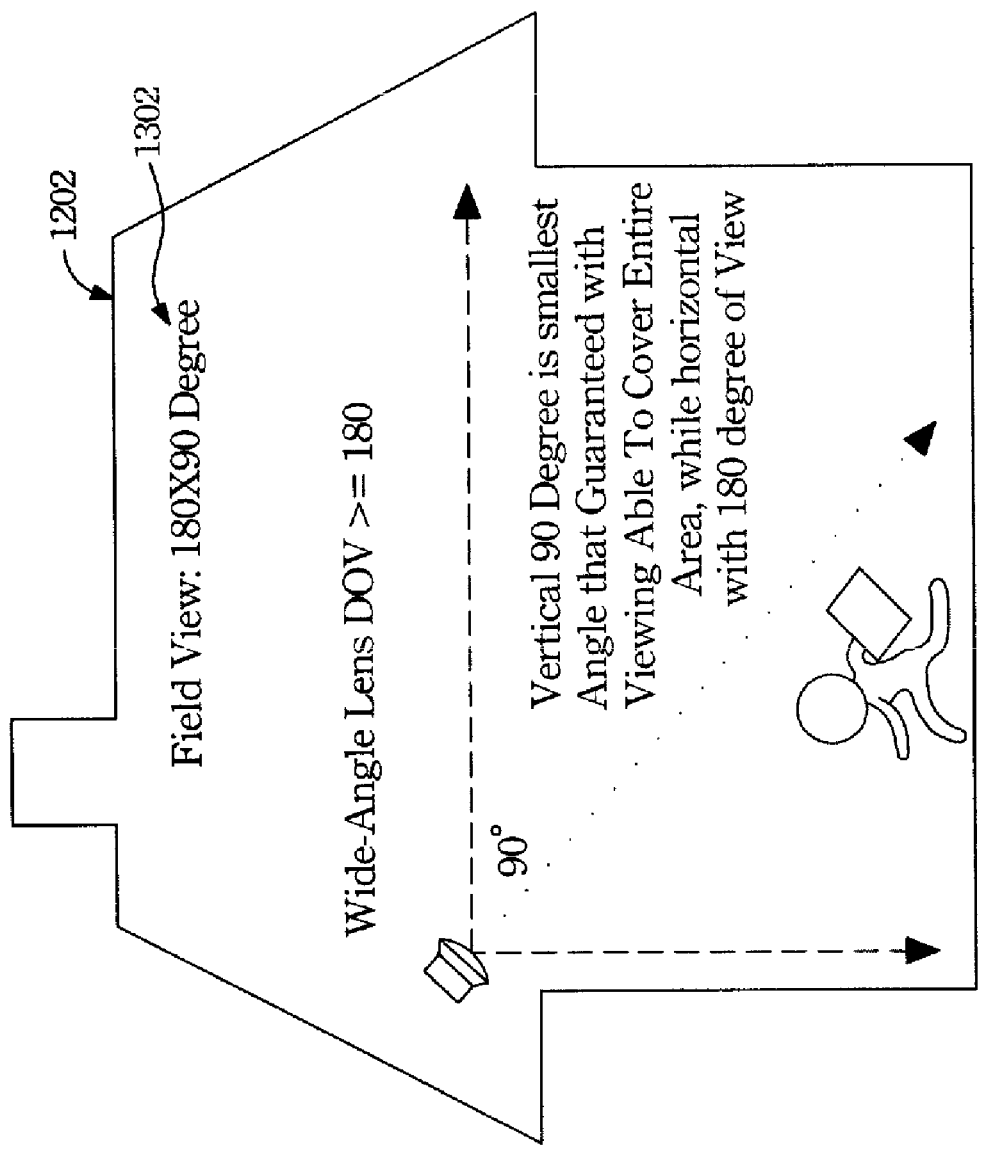
FIG. 13 illustrates a schematic view of monitoring the entire area of a room and mounting a camera on the wall of the room.
Figure 14:
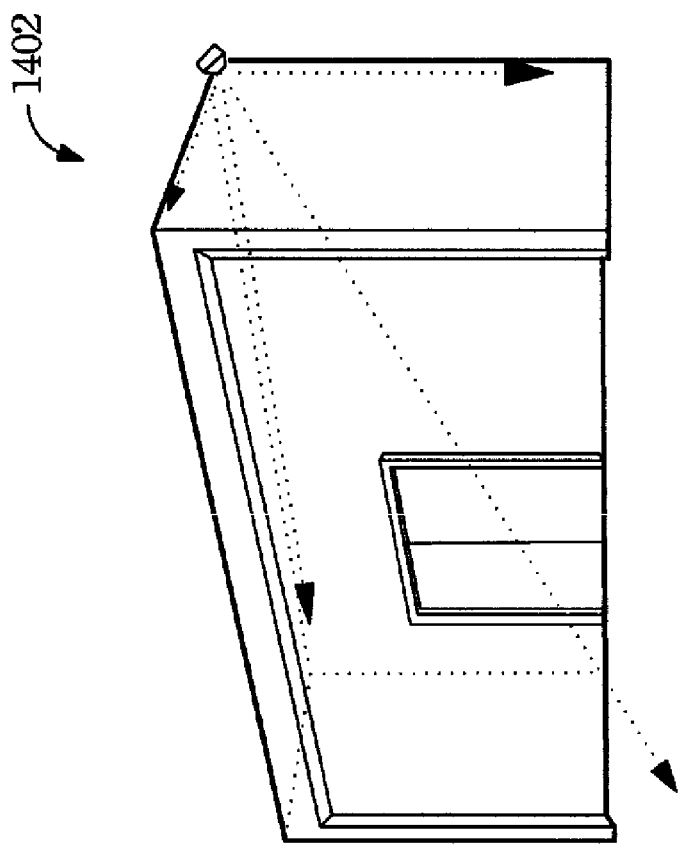
FIG. 14 illustrates schematic views of mounting a camera at the higher position of the corner of the room and a cone viewing space.
Figure 14:
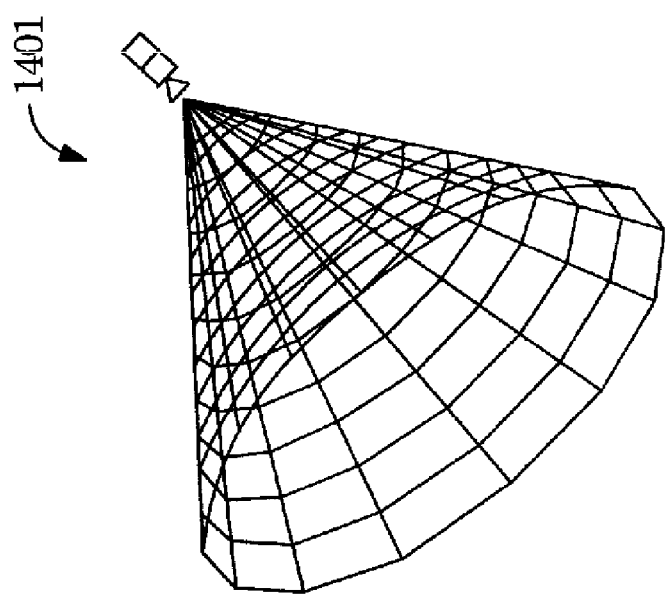
Figure 15:
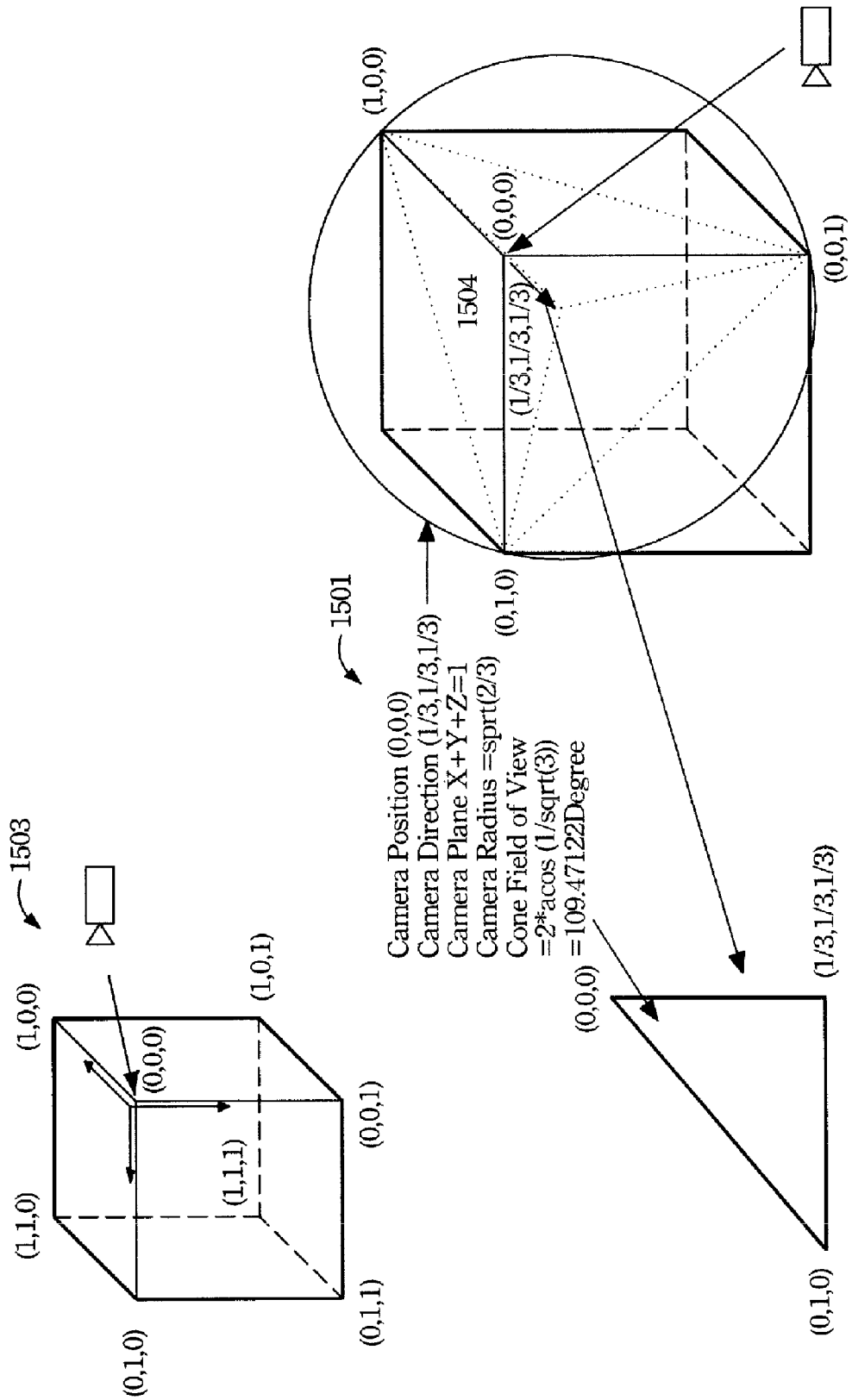
FIG. 15 illustrates a schematic view of equations to determine a minimum lens DOV and related diagrams.

The present invention is able to provide entire viewing. With reference to FIG. 13, while monitoring the entire area of a room 1302 and a camera being mounted on the wall of the room 1302, the image captured by the lens of the camera could provides that the HFOVR is not smaller than 180 degrees, and the VFOVR is not smaller than 90 degrees. With reference to FIG. 14, while a camera being mounted at a higher position of a corner of a room 1402, a cone viewing space 1401 is able to cover the entire room. To produce an entire view, the cone volume should cover three vertexes (1, 0, 0), (0, 1, 0), (0, 0, 1). The minimum lens DOV could be determined as equation 1501, which is 2 a cos(1/sqrt(3)) =109.47 degrees, with camera position (0, 0, 0) and lens toward (⅓, ⅓, ⅓) a direction 1504, as shown in FIG. 15. As a conclusion, we can use a lens with the conditions of (a) DOV>=180 degrees, a CCD/CMOS sensor which HFOVR>=180 degrees and VFOVR>=90 degrees, and a camera mounted on a wall of a room, or (b) DOV>=109.47 degrees, a CCD/CMOS sensor which HFOVR>=90 degrees and VFOVR>=90 degrees, and a camera mounted on a corner of a room, both conditions are able to provide entire view.

Figure 18:
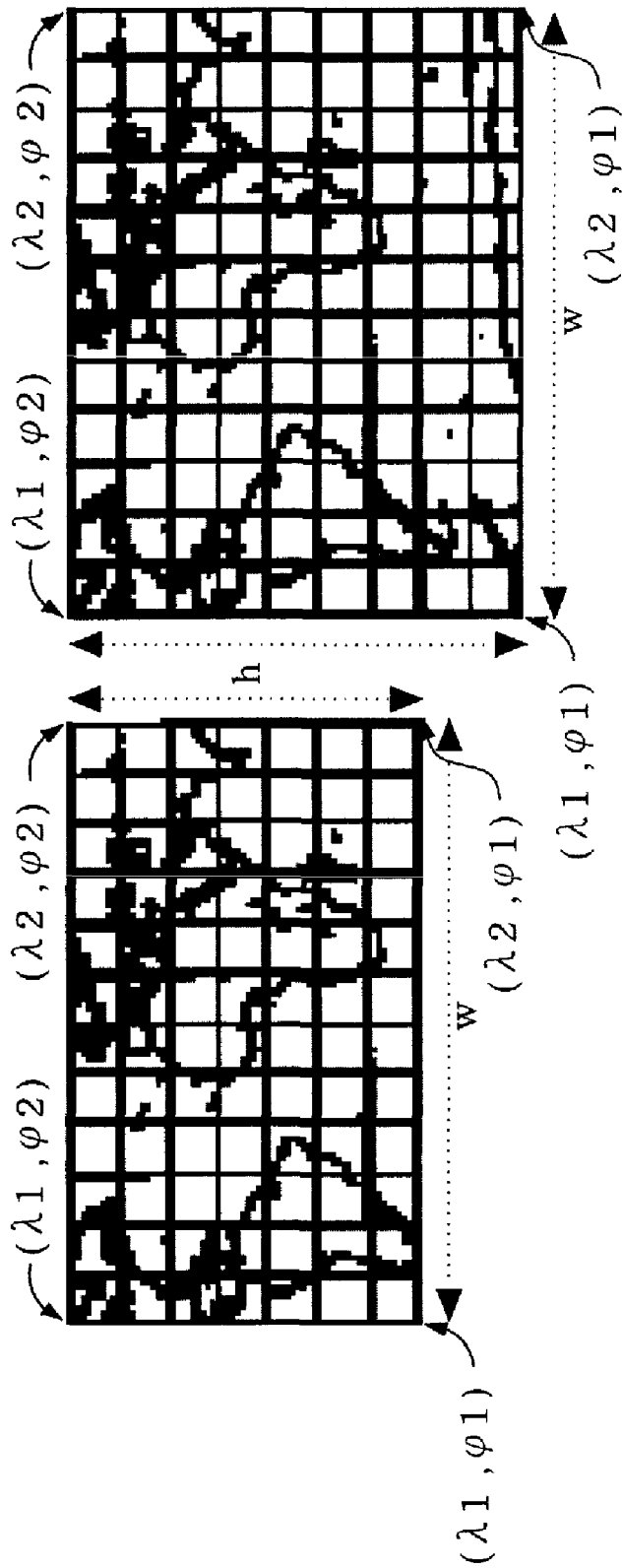
FIG. 18 illustrates calculations of a longitude angle and a latitude angle corresponding to a Cylindrical object plane.

Since Equidistant is the simplest one of all map, and graticules belongs to the equatorial aspect of the other Cylindrical projections 121, as shown in FIG. 1B-1. It is a Cylindrical projection in Cylindrical mode with standard meridians and parallels, all meridians have a constant scale and all parallels have another constant scale as well. The present invention adopts a Cylindrical Equal-distance projection as an embodiment, as shown in FIG. 16. Small circles in FIG. 16 are called Tissot's indicatrix or ellipse of distortion, detailed as shown in FIG. 17. FIG. 17 is a concept developed by Nicolas Auguste Tissot to measure and illustrate map distortions. Of course, Cylindrical equidistant projection is not the only Cylindrical projection mode of this transformation, it can be extended as other Cylindrical projections, such as Mercator, Miller, Equal-Area, etc. Equations (1-1) and (1-2) now can be expressed in FIG. 18:

A pixel in the Cylindrical object plane (x, y), the corresponding longitude angle $\lambda$ and latitude angle $\phi$ can be derived, where:

w: Width of Cylindrical image in pixels.
H: Height of Cylindrical image in pixels.
$\lambda 1$: Start longitude angle of Cylindrical.
$\phi 1$: Start latitude angle of Cylindrical.
$\lambda 2$: End longitude angle of Cylindrical.
$\phi 2$: End latitude angle of Cylindrical.
and, $$HFOVR = \lambda 2 - \lambda 1$$

$$VFOVR = \phi 2 - \phi 1$$

And, corresponding longitude and latitude can be calculated as:

$$\lambda[x,y] = F1\lambda(x,y) = \lambda 1 + HFOVR \times x/w \quad (7\text{-}1)$$

$$\phi[x,y] = F1\phi(x,y) = \phi 1 + VFOVR \times y/h \quad (7\text{-}2)$$

Equations (7-1) and (7-2) derive the ($\lambda$, $\phi$) for each pixel in object Cylindrical image. To produce a Cylindrical image corresponding to a source wide-angle image, the inverse mapping equations (2-1) and (2-2) from Cylindrical mode to Azimuthal mode are required. The present invention uses Azimuthal modes to simulate the wide-angle circular, full projection or rounded area, as shown in FIG. 8, with each pixel in Cylindrical image ($\lambda$, $\phi$) as input, to get the inverse mapping equations (2-1) and (2-2) from the corresponding (x, y) position of the source wide-angle image. The present invention uses six examples to describe the inverse equations as follows.

(a) Orthographic projection 901 and 1003 as shown in FIG. 9 and FIG. 10, the Perspective of the Azimuthal orthographic projection views the globe from an infinite distance. This Perspective gives the illusion of a three-dimensional globe. Distortion in size and area is near the projection limit to appear more realistic to our eye than that seen in almost any other projection, except for the Perspective. Azimuthal orthographic projection is limited to 90 degrees from the central point, a global hemisphere. Inverse equations (2-1) and (2-2) using the orthographic Azimuthal projection is given by:

$$x[\phi,\lambda]=\cos(\phi)\sin(\lambda-\lambda 0) \quad (8-1)$$

$$y[\phi,\lambda]=\cos(\phi 1)\sin(\phi)-\sin(\phi 1)\cos(\phi)\cos(\lambda-\lambda 0) \quad (8-2)$$

Where $\phi$ is the latitude, $\lambda$ is the longitude, and $\lambda 0$ and $\phi 1$ are reference longitudes and latitudes, respectively.

(b) Azimuthal Equal-Distant (Equidistant) Projections 903 and 1102: A map projection in which the distances between one or two points and every other point on the map differs from the corresponding distances on the sphere according to a constant scaling factor. In fact, Azimuthal equidistant projection is a non-Perspective projection. Let $\phi 1$ and $\lambda 0$ be the latitude and longitude of the center of the projection, the inverse equations (2-1) and (2-2) using Azimuthal equidistant projection is given by:

$$x[\phi,\lambda]=k\cos(\phi)\sin(\lambda-\lambda 0) \quad (9-1)$$

$$y[\phi,\lambda]=k[\cos(\phi 1)\sin(\phi)-\sin(\phi 1)\cos(\phi)\cos(\lambda-\lambda 0)] \quad (9-2)$$

Here, $$k=c/\sin(c)$$

where c is the angular distance from the center, and $$\cos(c)=\sin(\phi 1)\sin(\phi)+\cos(\phi 1)\cos(\phi)\cos(\lambda-\lambda 0)$$

(c) Lambert Azimuthal Equal-Area Projections 902 and 1101: The area of the Lambert Azimuthal equal-area projection is proportional to the area on the sphere, Lambert Azimuthal Equal-Area Projection is a non-Perspective projection, as shown in diagram 902 of FIG. 9. Inverse equations (2-1) and (2-2) using Lambert Azimuthal Equal-Area projection is given by:

$$x[\phi,\lambda]=k\cos(\phi)\sin(\lambda-\lambda 0) \quad (10-1)$$

$$y[\phi,\lambda]=k[\cos(\phi 1)\sin(\phi)-\sin(\phi 1)\cos(\phi)\cos(\lambda-0)] \quad (10-2)$$

where $\phi 1$ is the standard parallel, $\lambda 0$ is the central longitude, and $$k=sqrt(2/[1+\sin(\phi 1)\sin(\phi)+\cos(\phi 1)\cos(\phi)\cos(\lambda-\lambda 0)])$$

(d) Azimuthal Stereographic Projections 904, 1002, and 1200: Azimuthal Stereographic Projection is a planar Perspective projection, viewed from the point on the globe opposite the point of tangency 1005, as shown in FIG. 10. All meridians and parallels are shown as circular arcs or straight lines. Graticular intersections are 90 degrees. In the equatorial aspect, the parallels' curves are in opposite directions on either side of the Equator. The parallel opposite to the central latitude is a straight line; other parallels are concave toward the pole on the same side of the straight parallel, and normally limited to one hemisphere, a radius of 90 degrees from the center. Inverse equations (2-1) and (2-2) using Azimuthal stereographic projection is given by:

The transformation equations for a sphere of radius R are given by:

$$x[\phi,\lambda]=k\cos(\phi)\sin(\lambda-\lambda 0) \quad (11-1)$$

$$y[\phi,\lambda]=k[\cos(\phi 1)\sin(\phi)-\sin(\phi 1)\cos(\phi)\cos(\lambda-\lambda 0)] \quad (11-2)$$

where $\lambda 0$ is the central longitude, $\phi 1$ is the central latitude, and $$k=2R/[1+\sin(\phi 1)\sin(\phi)+\cos(\phi 1)\cos(\phi)\cos(\lambda-\lambda 0)]$$

(e) Gnomonic Projection: The Gnomonic projection is an Azimuthal projection that uses the center of the Globe as its Perspective point. All great circles are straight lines, regardless of the aspect. This is a useful projection for routes of navigation because the great circles highlight routes with the shortest distance. This projection is limited by its Perspective point and cannot project a line that is 90 degrees or more from the center point; this means that the equatorial aspect cannot project the poles, and the polar aspects cannot project the Equator. Inverse equations (2-1) and (2-2) using Azimuthal Gnomonic projection is given by:

Let $\lambda 0$ is the central longitude, $\phi 1$ is the central latitude, and P is the distance of the point of Perspective in units of sphere radii.

$$x[\phi,\lambda]=k\cos(\phi)\sin(\lambda-\lambda 0) \quad (12-1)$$

$$y[\phi,\lambda]=k[\cos(\phi 1)\sin(\phi)-\sin(\phi 1)\cos(\phi)\cos(\lambda-\lambda 0)] \quad (12-2)$$

and $$k=(P-1)/[P-\sin(\phi 1)\sin(\phi)-\cos(\phi 1)\cos(\phi)\cos(\lambda-\lambda 0)]$$

where c is the angular distance of the point (x, y) from the center of the projection, given by $$\cos(c)=\sin(\phi 1)\sin(\phi)+\cos(\phi 1)\cos(\phi)\cos(\lambda-\lambda 0)$$

(f) Vertical Perspective Projection: With reference to FIG. 12, the Perspective of the Azimuthal Vertical Perspective Projection views the globe from a specified distance rather than from an infinite distance as in the Orthographic projection. This Perspective provides the overall effect of a photograph of the earth taken from a satellite or space vehicle. The actual range depends on the distance from the globe. In all cases, the range is less than 90 degrees, as shown in diagram 1202 of FIG. 12, from the center. Diagram 1204 shows the effect of the projection when distance increased. Inverse equations (2-1) and (2-2) using Azimuthal vertical Perspective projection is given by:

Let $\lambda 0$ is the central longitude, $\phi 1$ is the central latitude, and P is the distance of the point of Perspective in units of sphere radii 1400, and $$x[\phi,\lambda]=k\cos(\phi)\sin(\lambda-\lambda 0)$$

$$y[\phi,\lambda]=k[\cos(\phi 1)\sin(\phi)-\sin(\phi 1)\cos(\phi)\cos(\lambda-\lambda 0)] \quad (13-1)$$

where $$\cos(c)=\sin(\phi 1)\sin(\phi)+\cos(\phi 1)\cos(\phi)\cos(\lambda-\lambda 0) \quad (13-2)$$

$$k=(P-1)/(P-\cos(c))$$

Note that points corresponding to cos(c)<1/P are on the back side of the globe and so should be suppressed when making the projection.

Referring to FIG. 10, which describes the method to create a Perspective view from a wide-angle image.

Figure 19:
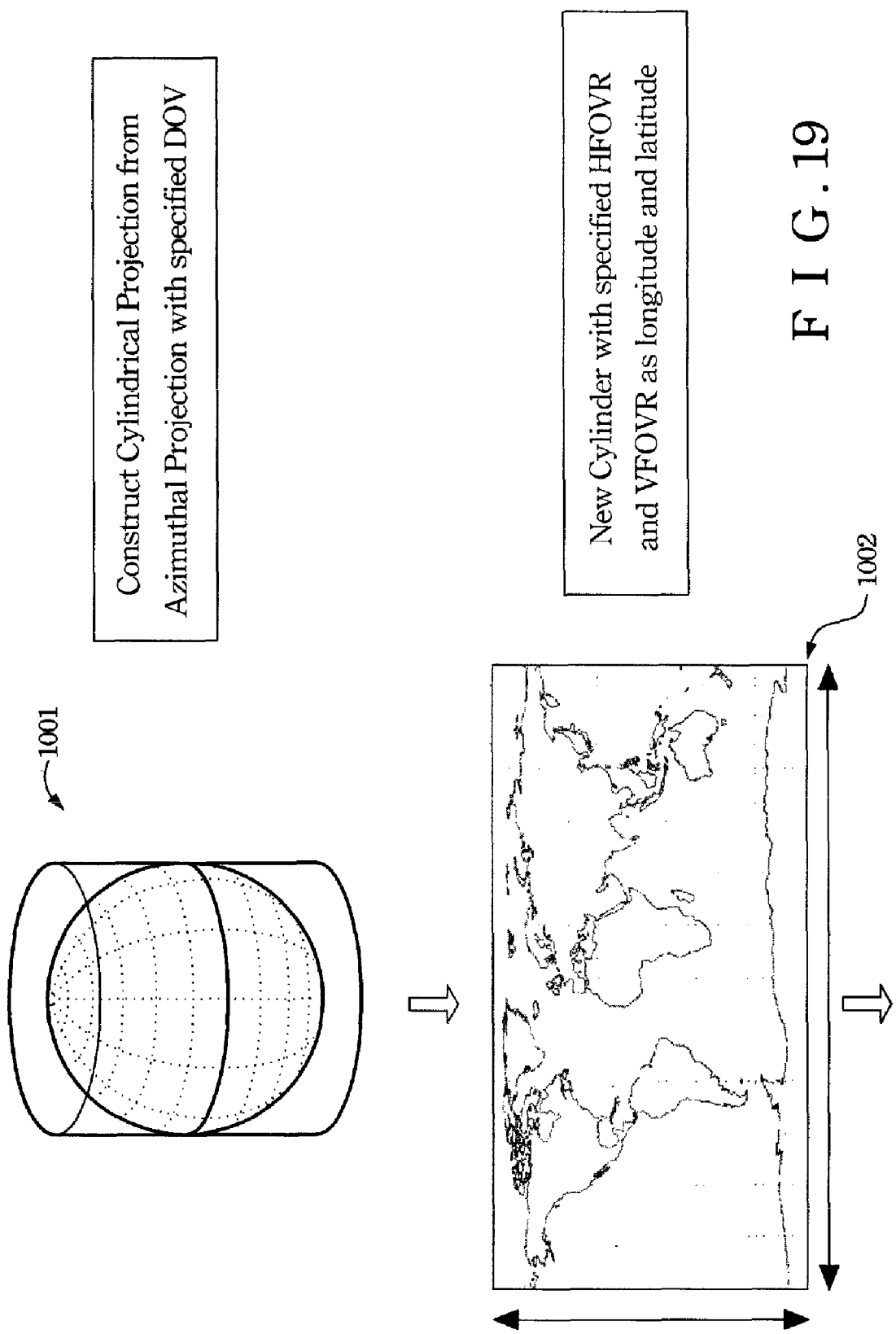
FIG. 19 illustrates a schematic view of sequential diagrams to producing a viewing image in Perspective mode as an output image.

For FIG. 19, which illustrates the steps to produce a viewing image in Perspective mode. Unlike the Cylindrical transform, the entire image can't be in a single transformation, but only the portion interest. The present invention utilizes three control parameters to generate object images, which include:
(a) Pan angle, hot-spots point longitude angle, as shown in diagram 1906 of FIG. 19 (b) Tilt angle, hot-spots latitude angle, as shown in diagram 1906 of FIG. 19, and (c) Horizontal Field-Of-View angle, as shown in diagram 1905 of FIG. 19, and it is used as magnify factor, the horizontal field of view angle at the object image vertical center.

The final projection is to create an image in Perspective mode from an image in Cylindrical mode. Following is the disclosure of the equations of the theory of the present invention. The fundamental equations that are used to calculate the image plane position for getting all Cylindrical image pixels with corresponding mapping positions in the format of (x, y).

The following defines the variables assigned and its description, (14) and the mathematics for the transformation:

λ: Longitude (Tilt) angle, its value can be represent as λ=Tilt*π/180.

φ: Latitude (Pan) angle, it's value can be represent as φ=Pan*π/180.

w: width of object image.

h: height of object image.

f: HFOV Horizontal Field-Of-View angle in Perspective object image can be represented as f=FOV*π/180.

π: 3.141592654 (ratio of the circumference of a circle to its diameter)

$$A = \begin{bmatrix} 1 & 0 & 0 \\ 0 & \cos(\lambda) & \sin(\lambda) \end{bmatrix}$$

where $$B = \begin{bmatrix} \cos(\varphi) & 0 & -\sin(\varphi) \\ 0 & 1 & 0 \\ \sin(\varphi) & 0 & \cos(\varphi) \end{bmatrix}$$

And M=A×B
Scale=w/(2×tan(f/2))
For all i=0 to 2
M[0][i]=M[0][i]/Scale
M[1][i]=M[1][i]/Scale
End for
define NORM(a,b)=sqrt(a×a+b×b)
The following substitutions simplify the mathematics for the transform and generating object images with Perspective view.
For each (y=0 to h)
u=−M[1][0]×y×(h/2)+M[2][0];
v=−M[1][1]×y×(h/2)+M[2][1];
z=−M[1][2]×y×(h/2)+M[2][2];
For each (x=0 to w)
s=−M[0][0]×x×(w/2)+u;
t=−M[0][2]×x×(w/2)+z;
/*Get Perspective projection point from Cylinder*/
/*Longitude Angle*/
λ=atan2(s, t);
/*Get Perspective projection point from Cylinder*/
/*Latitude Angle*/
φ=−atan2(v, NORM(s, t));
End for
End for Equations (14) derive Perspective mode images in Cylindrical coordinates. To get an exact image, a conversion from Cylindrical coordinate into Azimthal mode position is a must. Using inverse map equations (2-1) and (2-2), all corresponding mapping position in the format of (x, y) will be acquired from source Azimuthal images.

Equations (14) generate a projection in Perspective mode from a Cylindrical image, while inverse equations (8)~(13) for all generated (λ, φ) are added into equations (14). Equations (14) are also equivalent to generated projections in Perspective mode from Azimuthal wide-angle images, further, Cylindrical part may not be generated. The equations are suitable for all Azimuthal modes in the present invention by select different inverse mapping equations. The present invention provides a method to derive Perspective projected images from all different Azimuthal mode projection models.

However, a multi-view with multi object images can be utilized in either Cylindrical or Perspective format. FIG. 4A, FIG. 4B, and FIG. 4C are the examples of result images. FIG. 4A and FIGS. 5A, 5B, 5C, and 5D are stretched wide-angle source images, and FIG. 4B and FIG. 4C are objected images with specified longitude HFVOR 404 and latitude VFOVR 405. FIGS. 5A, 5B, 5C, and 5D depict four views represented by three controllers and one Cylindrical projection, that is, each of four sub-object images in Perspective mode includes the HFOV as shown in diagram 704 of FIG. 7, the HFOV as shown in diagram 502 of FIG. 5B, and the Hot-Spots (λ, φ) as shown in diagram 706 of FIG. 7. Diagram 504 of FIG. 5 is an example of combining the four sub-object images into a single object image as an output image. FIG. 4A to FIG. 4C are the mapping steps between Azimuthal mode to Cylindrical mode, and FIG. 5A to FIG. 5D include a Perspective view and three object images. Obviously, the present invention has the characteristics that are listed below:

(a) The diagram 505D of the sub-object image in Cylindrical mode provides an entire projection from a source wide-angle image with much less distortion than the original source image as shown in diagram 501 of FIG. 5A.

(b) The diagrams 506, 507, and 508 of the Perspective sub-object images provide three portions of the interest Perspective view image from the source wide-angle image, each sub-object images with three controllers, including PAN-TILT-ZOOM 108 by adjusting Hot-Spots, longitude HFOV, and latitude VFOV.

Although this invention has been disclosed and illustrated with reference to particular embodiments, the principles involved are susceptible for use in numerous other embodiments that will be apparent to persons skilled in the art. This invention is, therefore, to be limited only as indicated by the scope of the appended claims.

What is claimed is:

1. A method for providing an output image in either a Cylindrical mode or a Perspective mode, and comprising steps of:
    (1) acquiring a wide-angle image, which is a circular projection image, which format selected from the group of full circle, rounded rectangle, and full projection;
    (2) using a degree of view (DOV) and a radius of a projected circular region of the wide-angle image to select an image in an Azimuthal modes;
    (3) specifying a horizontal field of view range (HFOVR) and a vertical field of view range (VFOVR) as a source projection image region, which is in Azimuthal mode;
    (4) converting the source projection image region in Azimuthal mode into a new source projection image region in Cylindrical mode;
    (5) converting the new source projection image in Cylindrical mode into another source projection image in Perspective mode; and
    (6) generating the output image.

2. The method according to claim 1, wherein the wide-angle image has the DOV not smaller than 180 degrees, a projection horizontal field of view (HFOV) not smaller than 180 degrees, and a projection vertical field of view (VFOV) not smaller than 90 degrees, and is able to cover an entire scene, while the wide-angle image is acquired by a wide-angle lens located on a wall of the scene.

3. The method according to claim 1, wherein the wide-angle image has the DOV not small than 109.47122 degrees, a projection horizontal field of view (HFOV) not smaller than 90 degrees, and a projection vertical field of view (VFOV) not smaller than 90 degrees, and is able to cover an entire scene, while the wide-angle image is acquired by a wide-angle lens located in a corner of the scene.

4. The method according to claim 1, wherein the circular projection image is a polar projection image.

5. The method according to claim 3, in which create Perspective view from wide-angle Azimuthal projection, and object Perspective view image area is limit and bounded by a selected range horizontal field of view (HFOVR) with start angle and vertical field view (VFOVR) with start angle.

6. The method according to claim 1, wherein the Azimuthal modes comprises Orthographic, Lambert Equal-area, Equal-distance, Stereographic, Gnomonic, and Vertical Perspective.

7. The method according to claim 1, wherein the output image is an image in Perspective mode.

8. The method according to claim 1, wherein the circular projection image is an equatorial projection image.

9. The method according to claim 4, in which adjust hot-spot position moving pan and tilt viewing angle, and change HFOV or VFOV control the magnify said zoom factor.

10. The method according to claim 1, wherein the circular projection image is an oblique projection image.

11. The method according to claim 6, in which the Perspective view object image is created by a Perspective projection from a Cylindrical image, and have an inverse mapping from Cylindrical image to Azimuthal projection.

12. The method according to claim 6, in which the object image's PAN-TILT is control by move the hot-spots longitude and latitude angle, and ZOOM is control by the object image's horizontal field of view (HFOV), where HFOV is the view angle at object image vertical center.

13. The method according to claim 1, wherein the output image comprises a plurality of sub-images, which are in Cylindrical mode or Perspective mode.

14. The method according to claim 1, wherein the output image is an image in Cylindrical mode.

15. The method according to claim 13 further comprising the steps after the step (3) of:
(131) specifying a hot-spots, an HFOV, and a VFOV in the HFOVR and the VFOVR for each sub-image;
(132) converting the source image region in Azimuthal mode into a new source partial projection region in Cylindrical mode;
(133) deriving the sub-image that is a partial projection image in Cylindrical mode; and
(134) generating the output image that comprises a plurality of sub-images, which are in Cylindrical mode or Perspective mode.

16. The method according to claim 13 further comprising the steps after the step (3) of:
(131') specifying an HFOV and a VFOV to be equal to the HFOVR and the VFOVR;
(132') converting the source projection image region in Azimuthal mode into a new source full projection region in Cylindrical mode; and
(133') generating the output image that comprises a plurality of sub-images, which are in Cylindrical mode or Perspective mode.

17. The method according to claim 14 further comprising the steps after step (3) of:
(141) specifying a hot-spots, an HFOV, and a VFOV in the HFOVR and the VFOVR;
(142) converting the source image region in Azimuthal mode into a new source projection region in Cylindrical mode; and
(143) deriving the sub-image that is a partial projection image in Cylindrical mode.

18. The method according to claim 14 further comprising the steps after step (3) of:
(141') specifying an HFOV and a VFOV to be equal to the HFOVR and the VFOVR;
(142') converting the source image region in Azimuthal mode into a new source projection in Cylindrical mode; and
(143') deriving the sub-image is a full projection image in Cylindrical mode.

19. The method according to claim 7 further comprising the steps after the step (5) of:
(121) specifying a hot-spots and an HFOV in the HFOVR and the VFOVR;
(122) generating the output projection that is in Perspective mode; and
(123) deriving the image that is a local projection image in Perspective mode.

20. The method according to claim 13 further comprising the steps after the step (4) of:
(131") specifying a hot-spots and an HFOV in the HFOVR and a VFOV in the VFOVR;
(132") converting the new source projection in Cylindrical mode into another source projection in Perspective mode;
(133") deriving the sub-image that is a local projection image in Perspective mode; and
(134") generating the output image comprises a plurality of sub-images, which are in Cylindrical mode or Perspective mode.

* * * * *